(12) United States Patent
Sullivan

(10) Patent No.: US 11,624,631 B2
(45) Date of Patent: Apr. 11, 2023

(54) AUTONOMOUS ROBOTS AND METHODS FOR DETERMINING, MAPPING, AND TRAVERSING ROUTES FOR AUTONOMOUS ROBOTS

(71) Applicant: Nova Dynamics, LLC, Philomath, OR (US)

(72) Inventor: Joseph Sullivan, Philomath, OR (US)

(73) Assignee: Daxbot Inc., Philomath, OR (US)

( * ) Notice: Subject to any disclaimer, the term of this patent is extended or adjusted under 35 U.S.C. 154(b) by 382 days.

(21) Appl. No.: 16/782,469

(22) Filed: Feb. 5, 2020

(65) Prior Publication Data
US 2020/0173787 A1    Jun. 4, 2020

Related U.S. Application Data

(63) Continuation-in-part of application No. 15/361,045, filed on Nov. 24, 2016, now Pat. No. 10,650,300, and
(Continued)

(51) Int. Cl.
*G01C 21/00* (2006.01)
*G01C 21/36* (2006.01)
*G01C 21/34* (2006.01)
*G05D 1/02* (2020.01)
*G05D 1/00* (2006.01)

(52) U.S. Cl.
CPC ..... *G01C 21/3848* (2020.08); *G01C 21/3461* (2013.01); *G01C 21/3492* (2013.01); *G01C 21/3602* (2013.01); *G01C 21/3837* (2020.08); *G05D 1/0055* (2013.01); *G05D 1/0214* (2013.01); *G05D 1/0221* (2013.01); *G05D 1/0274* (2013.01)

(58) Field of Classification Search
None
See application file for complete search history.

(56) References Cited

U.S. PATENT DOCUMENTS 5,058,024 A    10/1991  Inselberg
5,559,511 A     9/1996  Ito et al.
(Continued)

OTHER PUBLICATIONS

Baraniuk, Richard, Ed., "Signals and Systems," University of Florida Press, pp. 1-403, 2009.
(Continued)

*Primary Examiner* — Yuen Wong
*Assistant Examiner* — Hongye Liang
(74) *Attorney, Agent, or Firm* — Kolitch Romano Dascenzo Gates LLC

(57) ABSTRACT

Methods for mapping safe and traversable routes for robot vehicles comprise using a deviation to create an operating range threshold that is to be included in a stored path and used by a robot vehicle as a threshold for normal operating conditions when the robot vehicle traverses a safe and traversable route. Methods for responding to unsafe conditions detected by a robot vehicle during operations comprise executing a contingency plan when a variance exceeds an operating delta and does not exceed an intervention delta. Methods for responding to anomalous conditions encountered by a robot vehicle comprise contacting a human controller when a variance exceeds an operating delta and an intervention delta.

12 Claims, 17 Drawing Sheets

Related U.S. Application Data a continuation-in-part of application No. 15/361,044, filed on Nov. 24, 2016, now Pat. No. 10,620,626, and a continuation-in-part of application No. 15/361,042, filed on Nov. 24, 2016, now Pat. No. 10,578,443, and a continuation-in-part of application No. 15/361,041, filed on Nov. 24, 2016, now Pat. No. 10,578,447.

(60) Provisional application No. 62/259,152, filed on Nov. 24, 2015.

(56) References Cited

U.S. PATENT DOCUMENTS

| | | |
|---|---|---|
| 5,787,262 A | 7/1998 | Shakib et al. |
| 5,806,074 A | 9/1998 | Souder et al. |
| 5,884,075 A | 3/1999 | Hester et al. |
| 5,889,953 A | 3/1999 | Thebaut et al. |
| 6,205,397 B1 | 3/2001 | Eslambolchi et al. |
| 6,490,519 B1 | 12/2002 | Lapidot et al. |
| 6,490,522 B2 | 12/2002 | Sugiyama et al. |
| 7,076,409 B2 | 7/2006 | Agrawala et al. |
| 7,430,261 B2 | 9/2008 | Forest et al. |
| 7,565,419 B1 | 7/2009 | Kwiatkowski et al. |
| 8,718,861 B1 | 5/2014 | Montemerlo et al. |
| 9,274,525 B1 | 3/2016 | Ferguson et al. |
| 9,298,183 B2 * | 3/2016 | Artés ............... G05D 1/0022 |
| 10,005,184 B2 * | 6/2018 | Gerio ................ B25J 13/088 |
| 2003/0220966 A1 | 11/2003 | Hepper et al. |
| 2010/0118147 A1 * | 5/2010 | Dorneich ......... H04N 21/44222 348/143 |
| 2010/0164699 A1 * | 7/2010 | Mohapatra ......... G07C 9/00309 340/426.13 |
| 2015/0006005 A1 * | 1/2015 | Yu .................... G06Q 50/28 701/22 |
| 2016/0123743 A1 | 5/2016 | Sisbot et al. |
| 2020/0022551 A1 * | 1/2020 | Watanabe ............ A47L 9/009 |

OTHER PUBLICATIONS

Hannah, Marsha Jo, "A System for Digital Stereo Image Matching," Photogrammetric Engineering and Remote Sensing, vol. 55, No. 12, pp. 1765-1770, 1989.

* cited by examiner

AUTONOMOUS ROBOTS AND METHODS FOR DETERMINING, MAPPING, AND TRAVERSING ROUTES FOR AUTONOMOUS ROBOTS

RELATED APPLICATIONS

The present application is a continuation-in-part of U.S. patent application Ser. Nos. 15/361,041, 15/361,042, 15/361,044, and 15/361,045, each of which claims priority to U.S. Provisional Patent Application No. 62/259,152. The disclosures of these patent applications are incorporated herein by reference.

FIELD

The present disclosure relates to route traversal by autonomously operating units.

BACKGROUND

Autonomously operating units (i.e., robots) are finding application in a wide variety of fields. One application is the use as an autonomous transport or delivery vehicle for the retail industry. In executing delivery activities, a robot may be confronted with having to draw up a map of surroundings, which are at first unknown, and then using this map to locate itself at any given instant in its working environment.

Prior methods for developing safe routes generally tend to rely on retrieving and utilizing data from the Geographical or Global Information System (GIS). GIS has allowed users to create spatial representations of the world for use in decision-making, navigation and many other applications that link natural and man-made features with their relative and unique 3-D positions on or near Earth. Data include Earth topography and vegetation, as mostly gathered by satellite imagery. Other features, such as the centerline of a road, are gathered by driving a vehicle with a GPS (Global Positioning System) and noting the location of intersections and waypoints. Utility locations are input by surveying with GPS. Collected into GIS databases, the data subsequently are used for vehicle navigation, building operations, emergency response, environmental health, and a wide variety of other applications. However, manual re-evaluation is time consuming, so most GIS data tends to be acquired once, and is updated rarely, if ever.

GIS data are often physical phenomena. Originally, GIS consisted of databases of satellite images of Earth, typically taken in multiple spectra. By comparing the various images over time, objects, changes, and patterns could be identified. While some features and their attributes can be imaged from satellites very efficiently, many physical objects are out of satellite view. Even where features are in view, it can be difficult to distinguish those features in a satellite view, and it is especially difficult to distinguish them automatically using software image analysis, for example. Thus, many features must be located manually, or local sensors must be placed at known locations to locate and/or track specific features. However, requiring humans to constantly re-evaluate safe routes or installing sensor systems along the safe route can be expensive and unsightly.

DESCRIPTION

Figure 1:
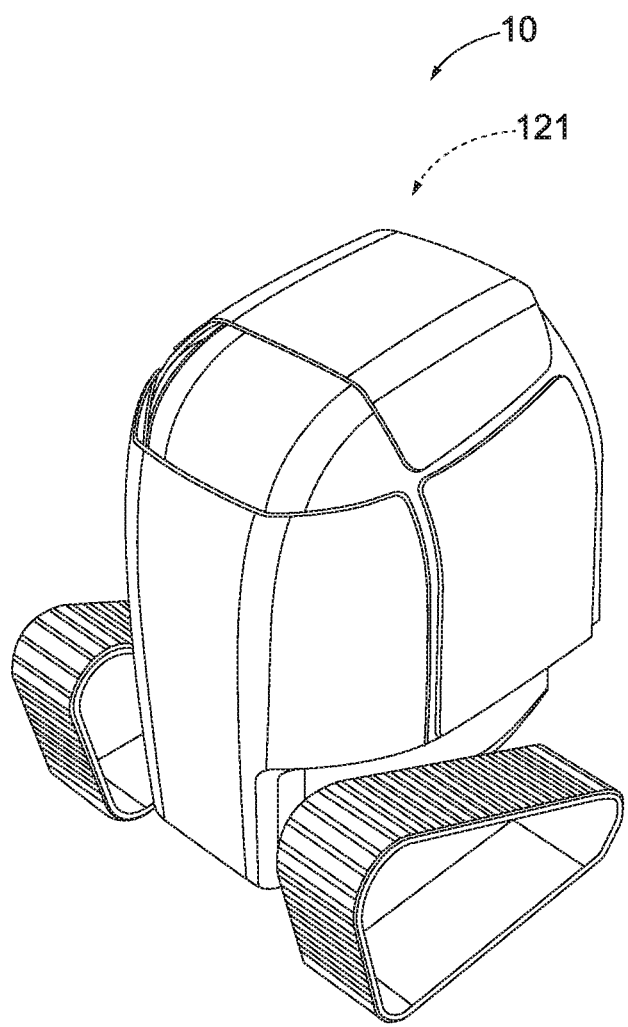
FIG. 1 illustrates an example of an autonomous delivery vehicle according to the present disclosure.

In the following detailed description, reference is made to specific embodiments in which aspects of the present disclosure may be practiced. These embodiments, or examples, are described in sufficient detail to enable those skilled in the art to practice the subject matter of the present disclosure. It is to be understood that the various embodiments of the present disclosure, although different, are not necessarily mutually exclusive. Furthermore, a particular feature, structure, or characteristic described herein in connection with one embodiment may be implemented within other embodiments without departing from the scope of the present disclosure. In addition, it is to be understood that the location or arrangement of individual elements within each disclosed embodiment may be modified without departing from the scope of the present disclosure. Likewise, the various elements of apparatuses and various steps of methods disclosed herein with respect to a particular aspect of the present disclosure are not limited to the particular aspect in which they are disclosed and may be implemented in one or more other aspects without departing from the scope of the present disclosure. The following detailed description is, therefore, not to be taken in a limiting sense.

The word "exemplary" is used herein to mean "serving as an example, instance, or illustration." Any embodiment described herein as "exemplary" is not necessarily to be construed as preferred or advantageous over other embodiments. Likewise, the terms "embodiment(s) of the present disclosure," "alternative embodiment(s)," and "exemplary embodiment(s)" do not require that all embodiments of the method(s) or apparatus include the discussed feature, advantage or mode of operation. The following description of the preferred embodiment is merely exemplary in nature and is in no way intended to limit the present disclosure, its application, or use.

There has thus been broadly outlined the more important features of the present disclosure in order that the detailed description thereof that follows may be better understood, and in order that the present contribution to the art may be better appreciated. There are, of course, additional features of the present disclosure that will be described hereinafter and which will form additional subject matter. Those skilled in the art will appreciate that the conception upon which this disclosure is based may be readily utilized as a basis for the designing of other structures, methods and systems for carrying out the purposes of the present disclosure. It is important, therefore, that any embodiments of the present disclosure be regarded as including such equivalent constructions insofar as they do not depart from the spirit and scope of the present disclosure.

The present disclosure generally relates to methods for determining and mapping safe and traversable routes for use by autonomous vehicles, methods for re-mapping the safe and traversable routes, methods for conflict resolution via contingency plan and human intervention, and component-based decision-making with centralized officiating.

FIG. 1 provides an illustrative, non-exclusive example of an autonomous delivery vehicle 10 according to the present disclosure. Autonomous delivery vehicle 10 may be configured to operate under similar conditions to a human delivery person. For example, autonomous delivery vehicle 10 may be configured to travel over sidewalks and/or crowded sidewalks and may travel at human-like speeds, such as in the range of 2 meters per second. As more examples, autonomous delivery vehicle 10 also may be configured to climb curbs and traverse uneven terrain, such as potholes, and travel up inclines at a reasonable speed, such as 0.25 meters per second up a 15% incline. Autonomous delivery vehicle 10 further may be configured to operate under a wide array of conditions including rain, temperatures ranging from −20 degrees Celsius to +40 degrees Celsius, and wind speeds of up to 9 meters per second.

Autonomous delivery vehicle 10 may be configured to carry a payload. In such examples the payload may weigh up to approximately 20 kilograms, such as an amount of groceries carried in two large grocery bags. With this in mind, autonomous delivery vehicle 10 may include a payload compartment, which may be refrigerated to accommodate perishable groceries. As yet more examples, autonomous delivery vehicle 10 may include a detachable trailer for carrying a larger payload, and the detachable trailer may include a refrigerated or heated compartment for carrying the payload.

Figure 5:
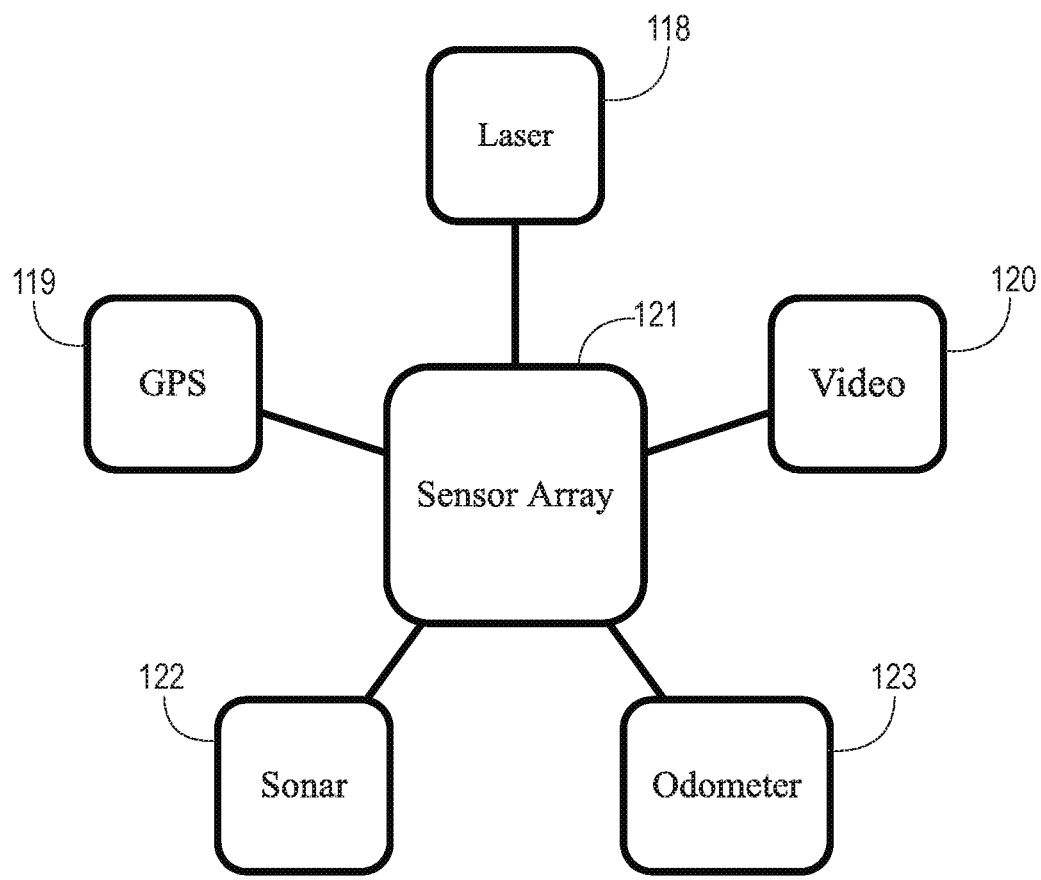
FIG. 5 is a block diagram showing a sensor array used to map a safe, traversable path according to examples of the present disclosure.

Referring again to FIG. 1, autonomous delivery vehicle 10 may include a sensor array 121 having a plurality of sensors that permit autonomous delivery vehicle 10 to sense its environment. An example of sensor array 121 is schematically represented in FIG. 5. As shown, sensor array 121 may include a GPS device 119 that may permit autonomous delivery vehicle 10 to geolocate within 5 centimeters. Sensor array 121 also may include other sensors such as a sonar device 122, or a laser sensor 118 that may permit autonomous delivery vehicle 10 to detect when the path or route along which it traverses is degraded. Sensor array 121 further may include a video camera 120 that may allow robot delivery vehicle 10 to broadcast 360 degree video back to a base location in real-time, such as with less than a 1 second delay. Sensor array 121 also may include sensors that are not explicitly shown in FIG. 5, such as a lidar device, a radar device, a thermometer, and an altimeter.

Now referring to a first aspect of the present disclosure, there is introduced a method for manually or semi-manually locating safe and traversable paths within an urban environment. The terms "method for manually or semi-manually locating safe and traversable paths in an urban environment," and "method for locating safe and traversable paths" may be used interchangeably. In addition to the functions, features, components, and abilities of the present disclosure already discussed in this specification, the present disclosure may also have, but not be limited to, the following features contained within the description below.

It is important to note that throughout this description, any references to data gathered from a sensor, sensor input, or data used to generate a delta can refer to an algorithm performed using data gathered from a sensor, or sensor synthesis. In some embodiments of the present disclosure, it is necessary to interpret, filter, or synthesize raw data to properly understand the meaning of the data. That is, one or more actions may be performed on sensor data before decisions regarding the data are made. Thus, The term "sensor data" can refer to data gathered from a sensor, the results of an algorithm performed on the data gathered from a sensor, or the results of sensor synthesis.

Figure 2:
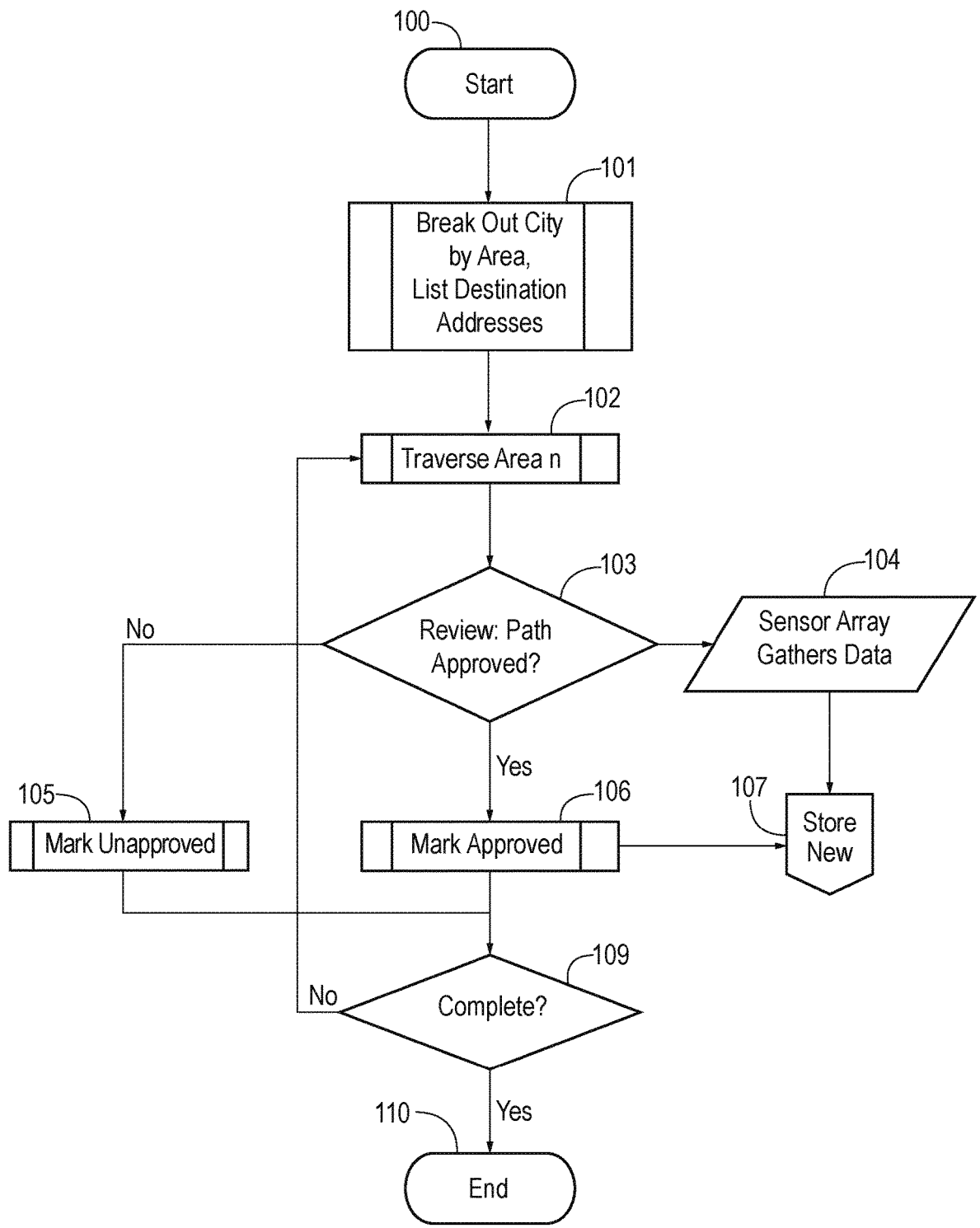
FIG. 2 is a flowchart showing the steps in an algorithm for mapping a safe, traversable path according to examples of the present disclosure.

Referring now to FIG. 2, there is shown a flowchart depicting the steps in an algorithm for mapping a safe, traversable path as according to an embodiment of the present disclosure. The method starts (at 100) when a user, a person, identifies an area in which to work. The area in which to work may be a given city or area within a city (at 101). The area can also be an entire small town, a neighborhood, a commercial area of a large town, or any selected area of an urban environment in which a user wishes to operate. A starting address, hereinafter referred to as an "Origin" is determined. The Origin can be a warehouse, distribution center, office, or the like from which a safe and traversable route will begin. Addresses that could potentially be destinations for a delivery vehicle, hereinafter referred to as the "Destination," within the given city or elsewhere are listed (at 101). The purpose of the method is to determine a route that can be safely traversed by an autonomous or semi-autonomous delivery vehicle. The delivery vehicle generally comprises a self-propelled vehicle capable of making at least one or more action decisions based on input received from its present environment. That is, the vehicle can decide how best to proceed, or whether not to proceed, when making deliveries given changing external conditions. As discussed herein, the autonomous or semi-autonomous delivery vehicle also may be referred to as a robot, a delivery vehicle, a mobile robot, a robot delivery vehicle, a vehicle, an unmanned vehicle, an autonomously operating unit, an autonomous mobile unit, and an urban delivery vehicle.

The city or area within a city selected (at 101) forms the area in which the autonomous delivery vehicle will operate. Prior to the delivery vehicle beginning operation, some or all of the area is traversed (at 102) by a traversal entity. The traversal entity gathers data so that a determination can be made regarding whether to approve a path (at 103) as safe and traversable by the autonomous delivery vehicle. The traversal entity may be the same entity that makes the approval decision (at 103), or may be an entity that gathers data about the path while another entity or person decides whether to approve or not approve the path (at 103).

The traversal entity may be a person that traverses and visually observes a proposed path from the Origin to the Destination. Alternatively, the person may operate an electronic device such as a video camera, a lidar sensor, a radar sensor, a Global Positioning System (GPS) sensor, a laser device, a sonar device, an odometer, a lidar device, a thermometer, and an altimeter when traversing a proposed path. The recorded data can later be analyzed to determine whether to approve the path (at 103) from the Origin to the Destination. If less than the entire area is traversed (at 102), the person may travel only proposed paths from the Origin to one or more Destinations.

Alternatively, the traversal entity may be an autonomous, semi-autonomous, or manually controlled vehicle device that can traverse an area (at 102) and proposed paths within that area. The path traversal vehicle may be a robot that utilizes one or more sensors, such as those discussed above with respect to the traversal entity, to gather data about a path traversed (at 102) within the area. When traversing a proposed path, the path traversal vehicle records data about proposed paths within an area so that the determination whether to approve the path as safe (at 103) can be made.

If the path is approved as safe, it is marked as an approved path (at 106) and is stored in an electronic database as a new path (at 107). The newly approved path is then considered to be safe and traversable. Delivery vehicles that must traverse from Origin to Destination can use paths that are approved.

Once a path is approved (at 103), a sensor array is used to gather data about the path (at 104). The sensor array comprises a plurality of sensors including, but not limited to: a video camera, a lidar sensor, a radar sensor, a Global Positioning System (GPS) sensor, a laser device, a sonar device, an odometer, a lidar device, a thermometer, and an altimeter. The output from each sensor is saved in a high level or summary form. In an embodiment of the present disclosure, approved paths are mapped a plurality of times under differing conditions. These differing conditions include different weather conditions, different traffic conditions, different times of day, and the like. A maximum delta value is then determined for each sensor using empirical or Bayesian methods. As discussed in more detail herein, the maximum delta value represents a threshold for use by the autonomous delivery vehicle when traversing the path, or route. If the maximum delta value is met or exceeded, the delivery vehicle may create an alert, make a decision, or perform an action in response to meeting or exceeding the maximum delta value. As discussed herein, the maximum delta value also may be referred to as an operating range threshold, an operating threshold, a maximum safe tolerance, a present safe tolerance, or a stored operating tolerance.

If the path is not approved, it is marked as an unapproved path (at 105). That path is deemed to be unusable by a delivery vehicle. The path may be unsafe, not traversable, or may contain one or more obstacles that the delivery vehicle cannot overcome. If a path is marked as unapproved (at 105), the traversal entity decides whether it has completed (at 109) traversing the area. If not, it continues to traverse the area (at 102). If it has completed traversing the area (at 109), then the process illustrated in FIG. 2 ends (at 110).

Figure 3:
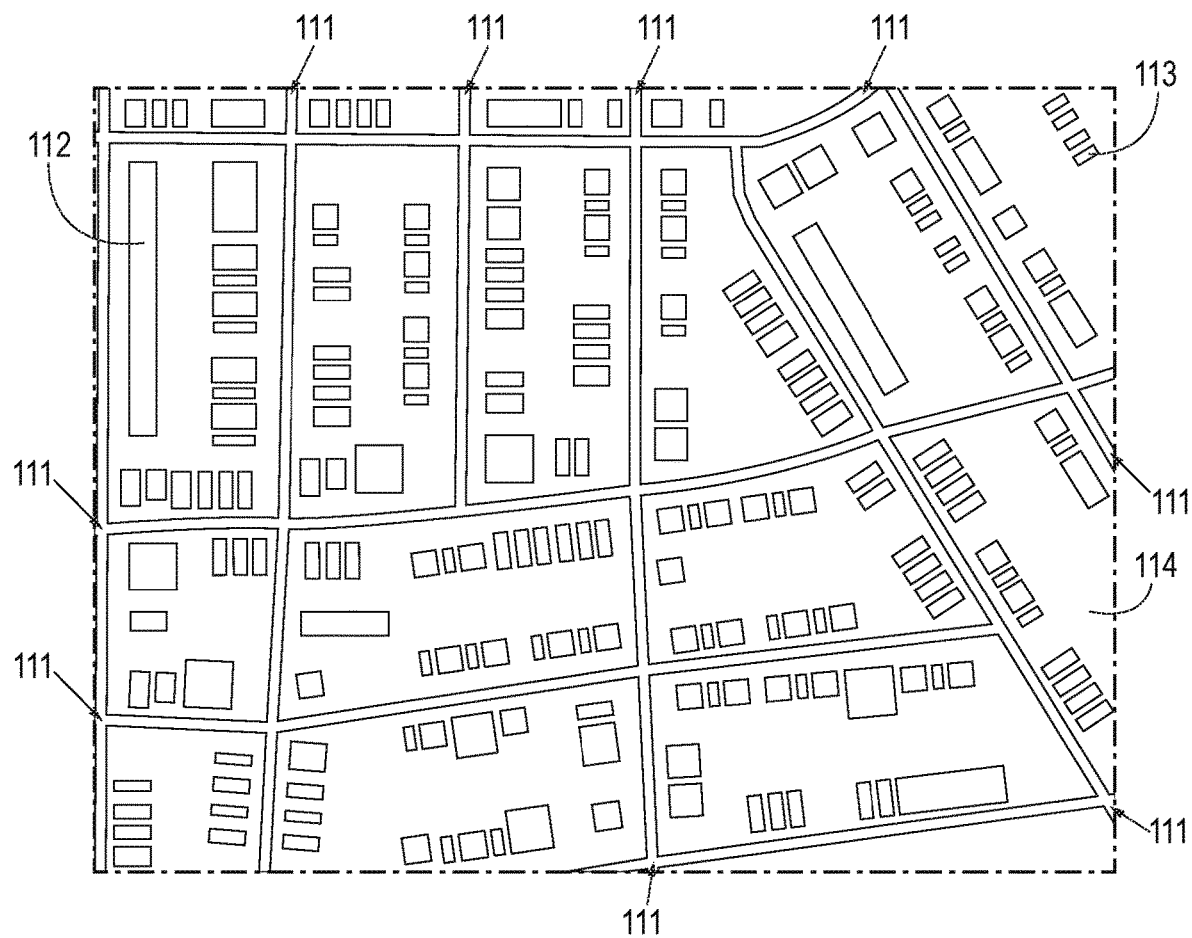
FIG. 3 illustrates a map showing a city section where a safe, traversable path is to be mapped according to examples of the present disclosure.

Referring now to FIG. 3, there is shown a map of a city section where a safe, traversable path is to be mapped as according to an embodiment of the present disclosure. This map depicts an area that a user selects to operate in during step 101 of FIG. 2. An area generally comprises a plurality of streets 111 and city blocks 114 as commonly found in an urban setting. The area chosen in FIG. 2 (at 101) is the area through which a delivery vehicle must pass. Before the delivery vehicle can safely traverse through the area, the traversal entity travels through the area and observes or records information about the area. The traversal entity collects visual or sensor data about the area so that a safe and traversable path from an Origin to a Destination can be mapped. It is important to note that potential Destinations can include residences 113 or non-residences 112 such as businesses.

The traversal entity may traverse some or all of the area, some or all of the streets 111, or may pass by some or all of the buildings 112, 113 in the area depending on the specific embodiment of the present disclosure.

Figure 4:
FIG. 4 illustrates a map showing a city section where a safe, traversable path is mapped according to examples of the present disclosure.

Referring now to FIG. 4, there is shown an example map of a city section where a safe, traversable path is mapped as according to an embodiment of the present disclosure. If a route 116 is approved as safe (FIG. 2, at 103) from an Origin 115 to a Destination 117, the route 116 is marked as approved (FIG. 2, at 106) and a sensor array gathers data (FIG. 2, at 104) about the path. Operation of the sensor array may occur manually, semi-autonomously, or autonomously.

The exact method by which the sensor array gathers information about the route 116 is embodiment-specific. In one embodiment of the present disclosure, a sensor array is traversed along the route 116 from Origin 115 to Destination 117. The sensor array is mounted on a vehicle and driven along the route 116 that a delivery vehicle will later take from Origin 115 to Destination 117. In another embodiment of the present disclosure, a sensor array is carried by a user walking the route 116 in reverse from Destination 117 to Origin 115. In still another embodiment of the present disclosure, a sensor array is mounted to a vehicle and a portion of the route 116 is driven by a user, the user then deviates from the route 116, then later returns to traverse a different portion of the route 116. In this embodiment of the present disclosure, deviation then resumption from mapping the route 116 may be necessary because a delivery vehicle may be able to traverse portions of the route 116 in an order different from an automobile, such as by proceeding up a sidewalk against one-way traffic.

Furthermore, some or all of a route 116 may be traversed a plurality of times to determine a range of operating conditions for a delivery vehicle. The range of operating conditions could include recording data from one or more type of sensor at different times of day, in different weather conditions, during rush hour or non-rush hour times, and the like. The purpose of traversing the route 116 a plurality of times is to develop a normal operating range for the delivery vehicle. During delivery operations, if a sensor on the autonomous delivery vehicle exceeds an operating range threshold, that occurrence would indicate a deviation from normal operating conditions. This occurrence would trigger an alarm, require the delivery vehicle to make a decision, or cause the delivery vehicle to notify a teleoperator.

Some examples of events that would result in a sensor detecting a non-normal condition could include, but are not limited to, a radar sensor detecting a delivery vehicle blocking a sidewalk, a camera detecting a pedestrian standing in the path of the delivery vehicle, a loss of GPS signal, and a sonar sensor detecting a telephone pole down across a road. Environmental conditions such as snow, heavy rain, flooding, ice, or excessive heat could result in the occurrence of a non-normal condition.

Referring now to FIG. 5, there is shown a block diagram of a sensor array 121 used to map a safe, traversable path as according to an embodiment of the present disclosure. The sensor array 121 comprises a plurality of sensors that are used to record data about a traversable path 116, as illustrated in FIG. 4. The array comprises at least one, but often more, sensors that each record a different type of data. In an embodiment of the present disclosure, a sensor array 121 comprises a laser 118, a GPS 119, a video recording device 120 or a video camera 120, a sonar device 122, and an odometer 123. Other embodiments of the present disclosure may include different combinations of sensors or sensors not pictured in FIG. 5. By way of example, an embodiment of the present disclosure may add a thermometer, an altimeter, a lidar device, and/or a radar device to the sensor package depicted in FIG. 5.

It should be noted that an autonomous delivery vehicle traversing the route mapped by the sensor array 121 may contain some or all of the same sensors 118-120, 122, 123 as the array 121 or some or all of the same sensors that were used to map the route. The delivery vehicle could then monitor the same sensor data for out-of-normal conditions, the occurrence of which may require an action or decision to be taken or made by the delivery vehicle or a teleoperator.

Figure 6:
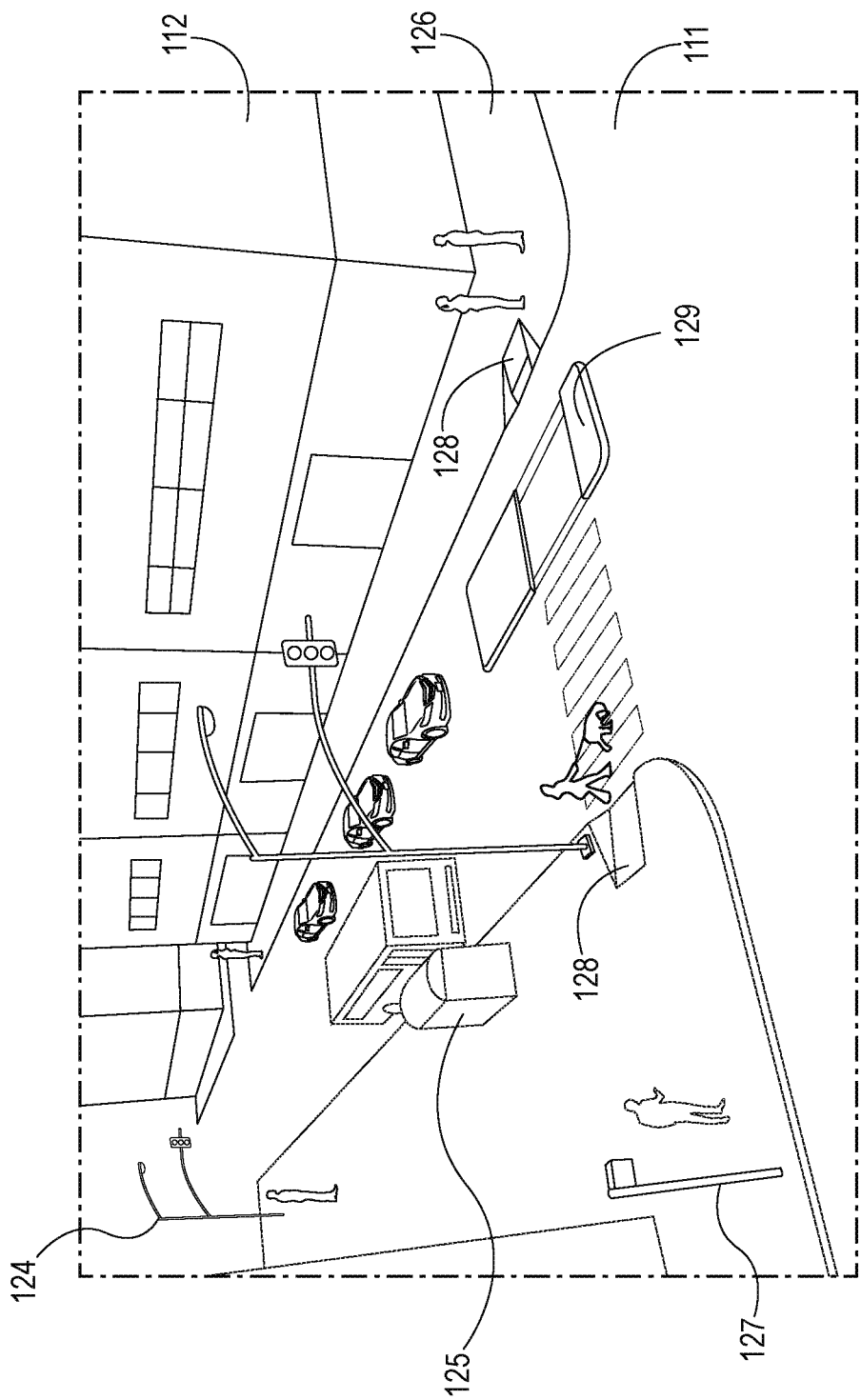
FIG. 6 illustrates examples of objects to be mapped when determining a safe, traversable path according to examples of the present disclosure.

Referring now to FIG. 6, there is shown a drawing with objects to be mapped when determining a safe, traversable path as according to an embodiment of the present disclosure. The drawing depicts an exemplary street scene, an intersection, as found in many urban environments. When mapping or traversing a route, the sensor array mapping the route and the delivery vehicle traversing the route must be aware of some or all of the objects within the environment.

At a common city intersection, mapping sensor arrays and delivery vehicles may use sensors to locate and identify: street lamps 124, commercial buildings 112, bus stop shelters 125, sidewalks 126, crosswalk signals 127, crosswalk ramps 128, crosswalk islands 129, and streets 111. Naturally, there may be many more objects that a sensor array must map and that a delivery vehicle must be aware of than those pictured in FIG. 6.

Each of the aforementioned urban features 111, 112, 124-129 may be detectable by a different type of sensor included as part of the sensor array or autonomous delivery vehicle. By way of example, a bus shelter 125 may be detectable by a radar sensor while a crosswalk ramp 128 may be detectable by a video camera. However, some types of features may be detectable by two or more sensors. Video data received from a video camera may be integrated with radar data to detect or refine the exact location of a building 112.

Proper mapping of the urban environment is required because each of the urban features 111, 112, 124-129 may cause the autonomous delivery vehicle to behave in a different manner. Upon detection of a street light 124, the autonomous delivery vehicle may alter course to avoid collision. But upon detection of a crosswalk ramp 128, the autonomous delivery vehicle may alter course to make use of the ramp 128. In addition, upon detection of a street 111, the delivery vehicle may activate additional sensors to scan for approaching vehicles prior to crossing.

Now referring to a second aspect of the present disclosure, there is introduced methods for re-mapping safe and traversable routes during delivery operations. As referred to herein, the terms "method for re-mapping a safe and traversable route during delivery operations" and "re-mapping safe and traversable routes," may be used interchangeably. Also as referred to herein, the terms "operator," "controller," "human controller," and "teleoperator" may be used interchangeably.

Figure 7:
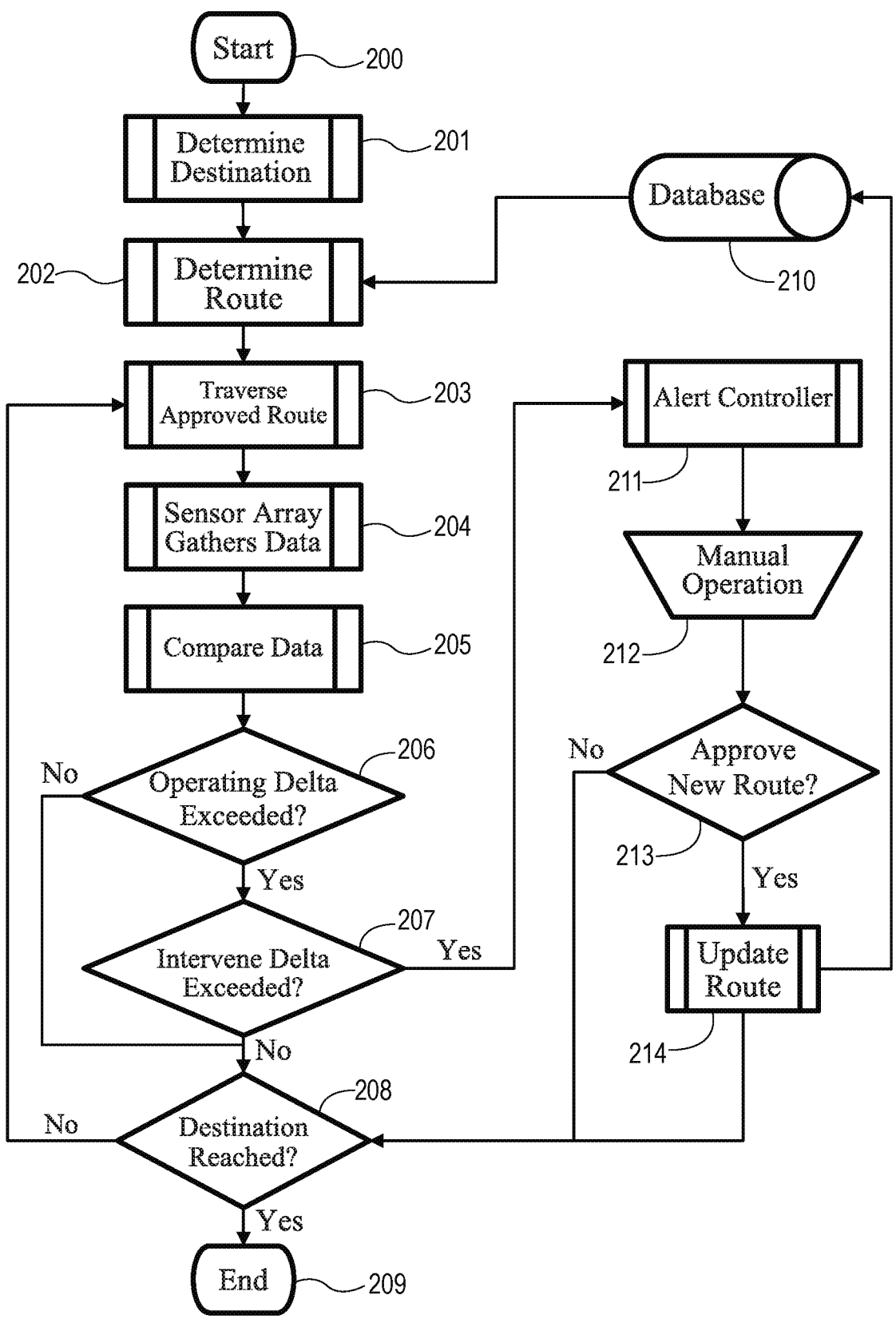
FIG. 7 is a flowchart showing the steps in a method for re-mapping a safe and traversable route during delivery operations according to examples of the present disclosure.

Referring now to FIG. 7, there is shown a flowchart displaying the steps in a method for re-mapping a safe and traversable route during delivery operations as according to an embodiment of the present disclosure. The method starts (at 200) when a delivery must be made. The Destination to which the delivery must be made is determined (at 201). Determining the delivery destination (at 201) may occur by receiving a delivery address, a business name, a set of coordinates, or the like. The Destination is within an urban area that has been previously mapped, as discussed herein. An Origin from which a route originates is also within the urban area. Prior to making the present delivery, the route from the origin to the delivery destination was previously mapped, scanned, and the route information stored in an electronic memory, such as a database 210, that is hosted on an electronic computing device. As discussed herein, scanning of the route was performed by using a sensor array containing a plurality of sensors. The sensors can include, but are not limited to, a Global Positioning System (GPS) sensor, radar, a visual recording device (i.e., a video camera), an odometer, and a sonar device. More examples of sensors that may be included in the sensor array include a lidar sensor and a laser sensor. Scanned information is stored in the database 210 and can include not only the information from the sensor array, but additional information such as, but not limited to, cardinal direction, turn directions, landmarks, terrain information, environment information, chronological information, and the like.

Route information that will allow a delivery vehicle to safely traverse from the Origin to the Destination is retrieved from the database 210 (at 202) by executing a series of machine instructions that cause the electronic computing device hosting the database 210 to physically configure its memory components so that they enter a "read" mode and read the stored route information. The read stored route information is used by the delivery vehicle to make the delivery to the destination.

The autonomous delivery vehicle receives the stored route information (at 202) and uses the information to safely traverse from origin to destination (at 203). Routes retrieved from the database 210 are considered to be safe and traversable and are approved for use by delivery vehicles.

During traversal of the route, the delivery vehicle scans the route again (at 204) using at least some of, if not all of, the same sensors that were used to generate the information stored in the database 210. The delivery vehicle carries with it a sensor array containing the sensors and uses the array to gather the new data (at 204).

The data gathered during the current traversal of the route is compared to the old data (at 205), the old data being the route information retrieved from the database 210. As long as the comparison between the new and the old data, the newly gathered data from the sensor array and the data gathered previously by a similar sensor array, do not exceed an operating or an intervention delta (at 206 and 207), then the delivery vehicle continues along the approved route (at 203) toward its destination.

While traversing its route, the delivery vehicle scans its immediate area using a sensor array. Data gathered from the array is compared against data (at 205) collected during the mapping phase of the route. During the mapping phase, some or all of the sensors presently on the autonomous delivery vehicle were used to build a profile of the route. The profile was stored to the database 210 after creation. The profile is retrieved from the database 210 and transferred to the delivery vehicle so that the delivery vehicle can make its delivery.

The scanned data is compared against the stored profile (at 205) while the vehicle traverses its route (at 203). As discussed herein, the profile was initially created by scanning the route at least once and creating a maximum safe tolerance, or an operating range threshold, for the data collected by each sensor. In the present disclosure, if data collected from any of the individual sensors within the array during delivery operations exceeds the maximum safe tolerance, or operating range threshold, for that sensor, then that sensor's operating tolerance, or operating delta, is exceeded (at 206). In some embodiments of the present disclosure, when any operating delta is exceeded, the delivery vehicle enters an alert mode. In other embodiments of the present disclosure, it may be possible to exceed one or more operating deltas without entering the alert mode. The process by for determining whether one or more operating deltas are exceeded is discussed in more detail herein with respect to the third aspect of the present disclosure.

In the alert mode, the vehicle may choose to follow a contingency plan. The contingency plan contains instructions that inform the robot how best to proceed such as, but not limited to, reducing speed, crossing the street, taking an alternate route, remaining motionless, and the like. The contingency plan may be dynamic and call for the vehicle to make its own decision based on the sensor input. The contingency plan instructs the autonomous delivery vehicle how to behave until the operating delta(s) return to normal. When the operating deltas return to normal, the alert mode is terminated.

When an operating delta is exceeded (at 206), a calculation is performed to determine whether an intervention delta is exceeded (at 207). As discussed in more detail herein with respect to the third aspect of the present disclosure, the intervention delta is a value that, when exceeded, causes the delivery vehicle to alert a human controller (at 211). The intervention delta is contained within the route profile and retrieved from the database 210 prior to the vehicle traversing the route (at 203) to the destination. Data gathered from each sensor within the delivery vehicle's sensor array is compared against an intervention delta unique to that sensor. That is, a radar sensor may have a different intervention delta than a sonar sensor.

Once the human controller is alerted (at 211) the controller receives information regarding the circumstances or condition of the vehicle. A manual operation mode (at 212) may be entered where the controller manually assumes control of the vehicle operating it remotely. If the manual operation mode (at 212) is entered and the operator takes control, the operator may drive the vehicle until the hazard or obstacle that caused the intervention delta to be exceeded is avoided, or may take a different action as appropriate for the situation. The operator will attempt to avoid damage to the delivery vehicle, injury to people, or damage to objects in the vehicle's area. The operator will also attempt to complete the delivery, if possible.

During manual operation (at 212), data gathered from the delivery vehicle's sensors (at 204) will be reviewed autonomously, semi-autonomously, or manually to decide whether to re-commit the newly gathered data to the database so that the route to that destination is altered (at 214), or so that the operating or the intervention delta is adjusted. Data from one or a plurality of the sensors may be reviewed and re-committed to the database as deemed appropriate for the situation.

Once the delivery vehicle's destination is reached (at 208) the method illustrated in FIG. 7 ends (at 209).

Referring back to FIG. 4, there is shown a map with a safe and traversable route 116 used during delivery operations as according to an embodiment of the present disclosure. An autonomous delivery vehicle will begin delivery operations by departing from an Origin 115 and traversing along the route 116 to a Destination 117. This route 116 was mapped and scanned, as discussed herein, prior to the delivery vehicle engaging in delivery operations. This route may also have been adjusted after a previous delivery attempt to the same destination 117 from the same origin 115 caused an intervention delta to be exceeded, as illustrated in FIG. 7 (at 207). During manual operation of the delivery vehicle, data gathered by the vehicle may have been reviewed then recommitted to a database, resulting in creation of the present route 116.

This process of re-scanning a route occurs, and possibly re-mapping the route if unsafe conditions are met occurs, during each delivery operation of the autonomous vehicle. New or previously undetected conditions may arise that require subsequent delivery attempts from the Origin 115 to the Destination 117 to take a new route. Thus, the path taken by delivery vehicles from the Origin 115 to the Destination 117 is constantly under review for unsafe conditions. Unsafe conditions are any obstacles, features, terrain factors or the like that may cause damage to the delivery vehicle, injury to people, prevent delivery, or cause damage to something in the vehicle's environment. It should be noted that a route that is approved as safe and traversable from the Origin 115 to the Destination 117 may not be the fastest route.

Figure 8:
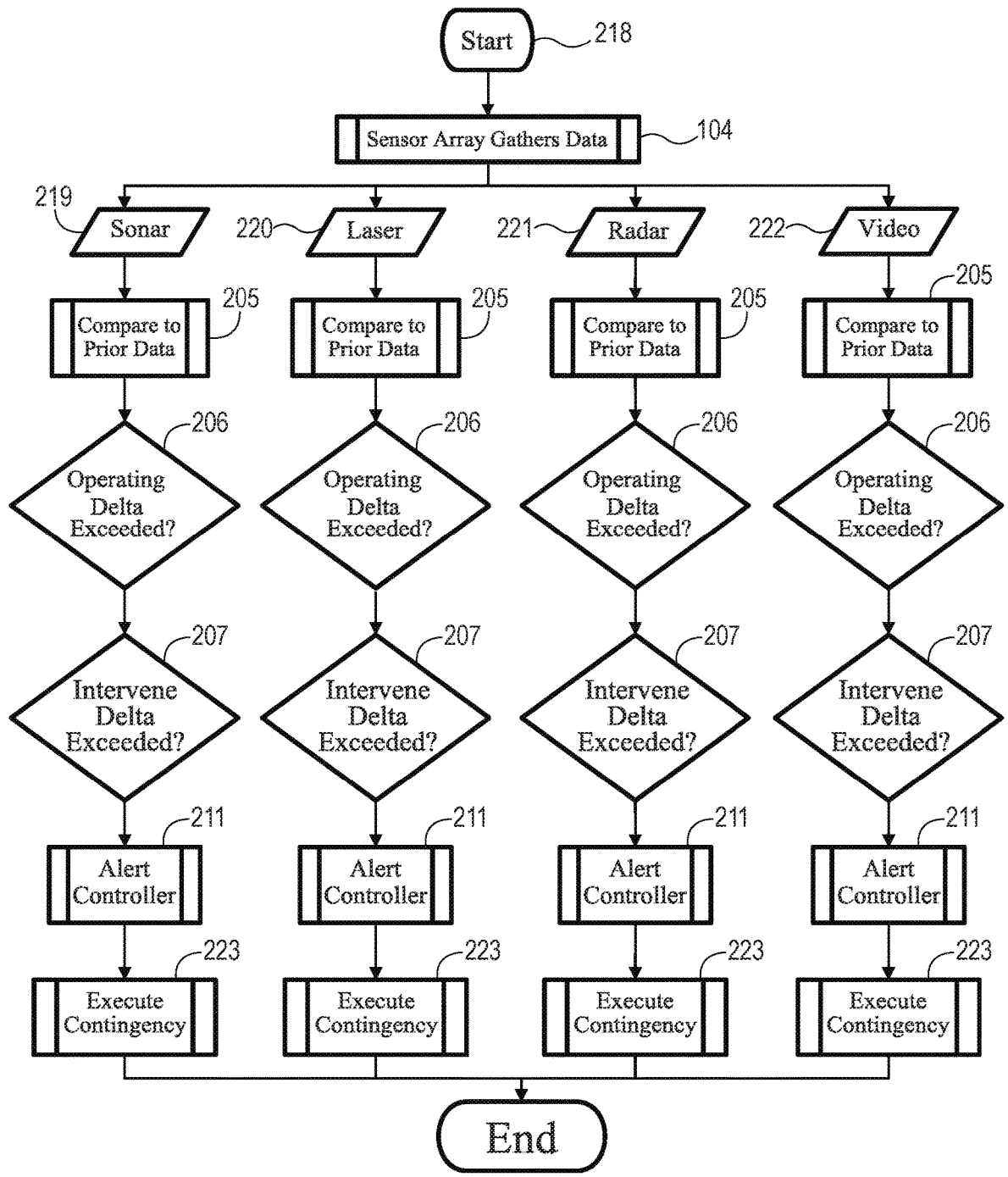
FIG. 8 is a flowchart showing the operating and intervention delta analysis procedure for each sensor in a sensor array according to examples of the present disclosure.

Referring now to FIG. 8, there is shown an operating and intervention delta analysis procedure for each sensor in a sensor array as according to an embodiment of the present disclosure. The illustrated procedure is a component of the present disclosure and is set forth in greater detail in FIG. 8. The procedure begins (at 218) when a sensor array gathers data (at 104) while an autonomous delivery vehicle is performing delivery operations. The sensor array contains some or all of the same sensors what were used to map and scan the route that the delivery vehicle is presently traversing. In this embodiment of the present disclosure, a sonar device 219, a laser 220, a radar device 221 and a video recorder 222 comprise the sensors within the array. Data gathered from each sensor 219-122 is compared to data previously gathered (at 205) for that device. The previously gathered data may have been generated during initial scanning of the route, or may have been generated during a previous delivery operation then saved when the route or operating deltas of the sensor array were updated.

If the comparison of the present device data to the prior data (at 205) results in an operating delta being exceeded (at 206), a second check is made to determine whether an intervention delta has also been exceeded (at 207). If either the operating delta or intervention delta is exceeded (at 206 and 207), a plurality of actions may be taken by the autonomous vehicle or by controllers of the vehicle. The autonomous vehicle may execute a contingency plan, take an alternate route, notify a controller (at 211), decrease speed, or make its own decision on how to proceed. If the controller is notified (at 211), then the controller may take manual control of the vehicle. If the operating delta is exceeded (at 206), the autonomous vehicle may execute a contingency plan (at 223). The procedure ends when the intervention delta and the operating delta return to a normal operating range for each sensor 219-222.

It should be noted that independent comparisons are made, and if any of the sensors detect data that is not within a normal operating range threshold then that sensor's operating or intervention delta may be exceeded (at 206 and 207). In an embodiment of the present disclosure, if data collected by the sonar device 219 exceeds its operating delta (at 206), then steps 207, 211, and 223 are executed. In another embodiment of the present disclosure, if data gathered by the video recording device 222 exceed its operating delta (at 206) then steps 207, 211, and 223 are executed.

Figure 9:
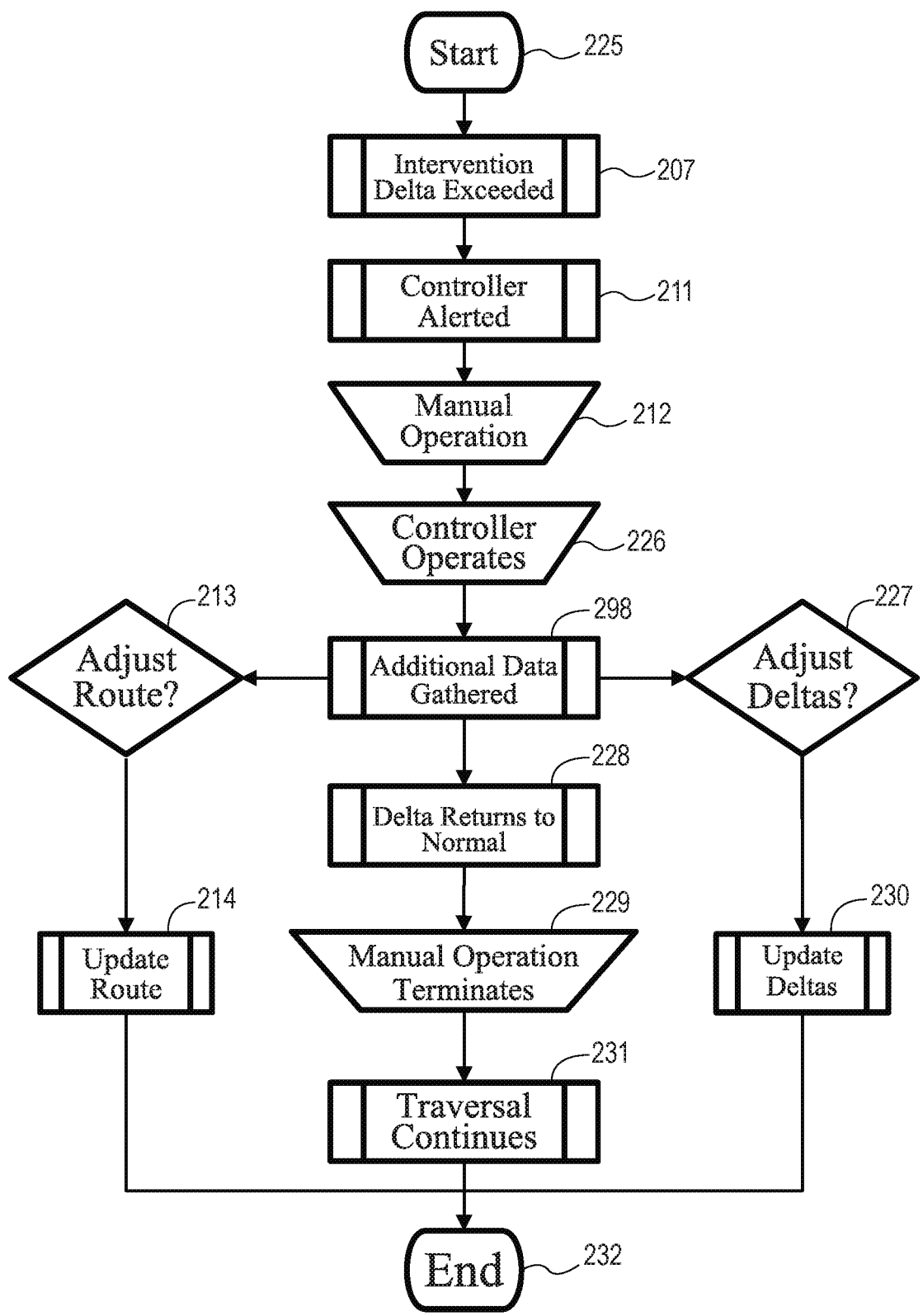
FIG. 9 is a flowchart with the steps taken if an intervention delta is exceeded during traversal of a route during delivery operations by a delivery vehicle, thereby resulting in re-mapping operations according to examples of the present disclosure.

Referring now to FIG. 9, there is shown a flowchart with the steps taken if an intervention delta is exceeded during traversal of a route during delivery operations by a delivery vehicle, thereby resulting in re-mapping operations as according to an embodiment of the present disclosure. The steps begin (at 225) when an intervention delta is exceeded (at 207) during autonomous vehicle delivery operations. An intervention delta is exceeded (at 207) generally when an occurrence of such a magnitude occurs that the autonomous delivery vehicle is incapable of resolving the situation without human intervention.

When the intervention delta is exceeded (at 207) the delivery vehicle transmits an alert to a controller (at 211). The controller is at a remote location such as the vehicle's origin or at a control center. The controller receives data from the autonomous vehicle which can include, but is not limited to, a live video feed, information from the vehicle's sensor array, GPS data, and the like. From the received information, the controller can decide whether to provide additional instructions to the autonomous vehicle so that the vehicle can resume delivery operations, whether the alert was a false alarm, or whether to place the vehicle in a manual operation mode (at 212). If the vehicle is placed in a manual operation mode (at 212), the controller remotely operates (at 226) the delivery vehicle in an effort to mitigate the dangerous or non-traversable conditions that gave rise to the exceedance of the intervention delta (at 207).

Before, during, and after the period when the controller is controlling (at 226) the vehicle, additional data is gathered (at 298) that will allow the controller, or another decision-making entity, to adjust the route (at 213) or update the intervention delta (at 227) so that the intervention delta will not be exceeded during future delivery operations. The decision to update the route (at 213) or adjust the deltas (at 227) may be made manually by a person reviewing the data, or semi-autonomously by a person with the aid of a computer-executed algorithm. The decision to adjust the route (at 213) or update the delta (at 227) may be made if the person reviewing the data notices an occurrence that makes the route no longer safe or traversable. In an embodiment of the present disclosure, a person reviewing the data sees a "road closed" sign in video data retrieved from the vehicle. The person then decides to update the route (at 213) by choosing a different road for the vehicle to traverse.

The controller can continue to operate the vehicle (at 226) until the intervention deltas return to a normal operating range (at 228). That is, once data being gathered by one or more sensors in the vehicle's sensor array does not exceed an intervention threshold when compared against previously recorded data, the intervention delta is considered to have returned to normal (at 228). When the intervention delta returns to normal (at 228), manual operation of the delivery vehicle will terminate (at 229) and the vehicle will continue to traverse the route (at 231) until it reaches its destination. When the vehicle reaches its destination, the series of steps set forth in FIG. 9 ends (at 232). Although not pictured, in some embodiments of the present disclosure, manual operation (at 212) can continue even when the intervention delta returns to normal (at 228). In these embodiments, the controller may have decided continued manual operation was appropriate under the given situation.

If the route is adjusted (at 213), route information such as directions, GPS coordinates, the path to take, sensor information and the like is stored to an electronic memory so that delivery vehicles making deliveries to the same destination will utilize the updated route information. The re-scanning and potential updating of the route (at 214) is performed on every delivery operation so that changes in the environment can be identified and potential problems for future delivery vehicles avoided.

If the deltas are adjusted (at 227), sensor information such as data gathered by a laser sensor, a radar device, a sonar device, a video camera, a GPS sensor, or an odometer is analyzed and a revised safe operating threshold is determined for one or more of the vehicle's sensors. The updated safe operating threshold, the newly gathered data, or both, are stored in an electronic memory. Delivery vehicles traversing from the same origin to the new destination will use the updated sensor thresholds when determining if their intervention delta has been exceeded.

Figure 10:
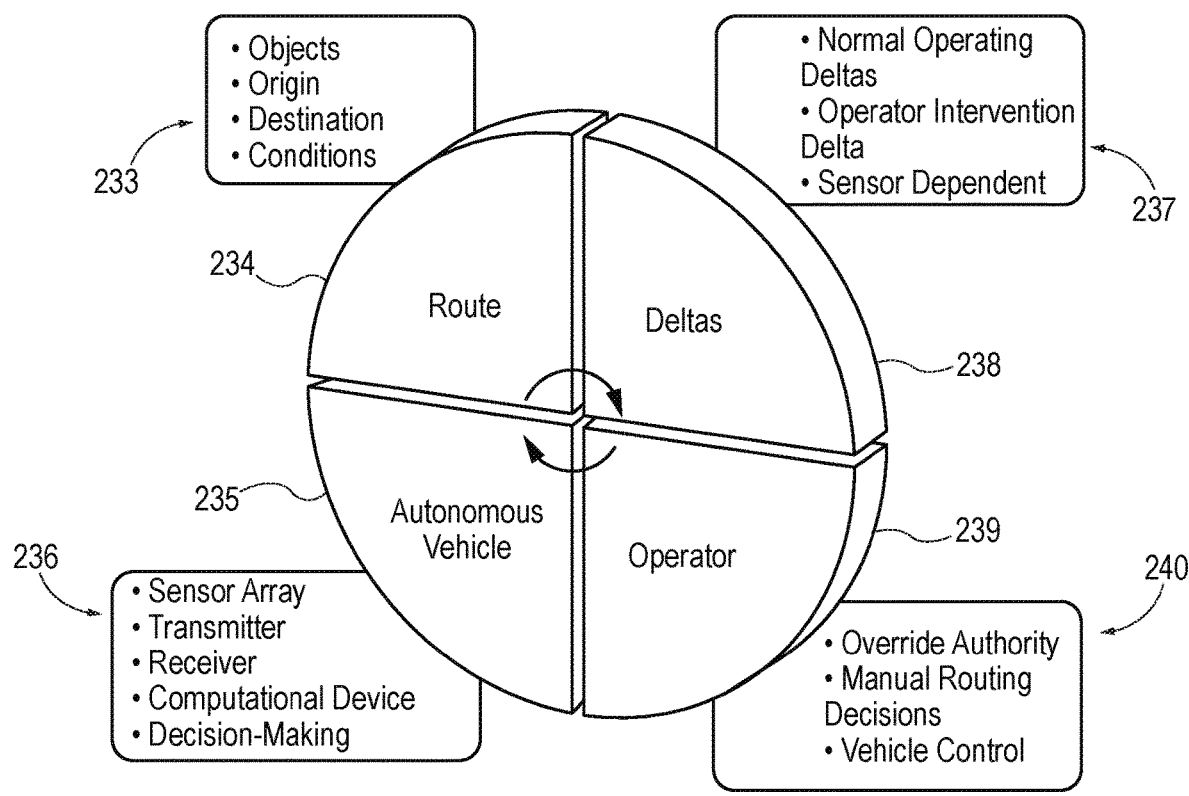
FIG. 10 is a diagram showing the primary components and exemplary attributes in a method for re-mapping a safe and traversable route during delivery operations according to examples of the present disclosure.

Referring now to FIG. 10, there is shown diagram setting forth the primary components and their exemplary attributes in a method for re-mapping a safe and traversable route during delivery operations as according to an embodiment of the present disclosure. One of the primary components is a route 234 that an autonomous delivery vehicle 235 uses to safely traverse from an origin to a delivery destination 233. Along the route 234 the autonomous delivery vehicle 235 may encounter a wide variety of objects 233 that were not present when the route 234 was initially scanned and safe operating thresholds for the route were determined. If the safe operating thresholds are exceeded, one or more deltas 238 are considered to be exceeded, thereby necessitating that an action to be taken. The deltas 238 are unique to each sensor 237 that a vehicle 235 possesses. Exceeding the delta 238 may cause the vehicle 235 to enter an alert mode.

The presence of new and potentially dangerous objects in the route 234 may require an operator 239 to assume control of the vehicle 240. Such objects 233 can include, but are not limited to, fallen trees, vehicles, pedestrians, potholes, aggressive animals, street closures, and trash or recycling cans. Similarly, changed conditions 233 such as inclement weather, snow, or ice may also necessitate the operator 239 to exercise their override authority 240 and take control of the vehicle 235.

If the objects or changed conditions do not require operator 239 intervention, the vehicle 235 will use an on-board computational device 236 to make a decision as to how best to proceed. If the objects or changed conditions 233 require the vehicle 235 to contact the operator 239, the vehicle 235 will transmit an alert to the operator 239.

Referring now to a third aspect of the present disclosure, there is introduced a method for conflict resolution via contingency plan execution or human interaction. The terms "method for conflict resolution via contingency plan execution or human interaction," "conflict resolution via contingency plan execution or human interaction," and "conflict resolution method" may be used interchangeably.

Figure 11:
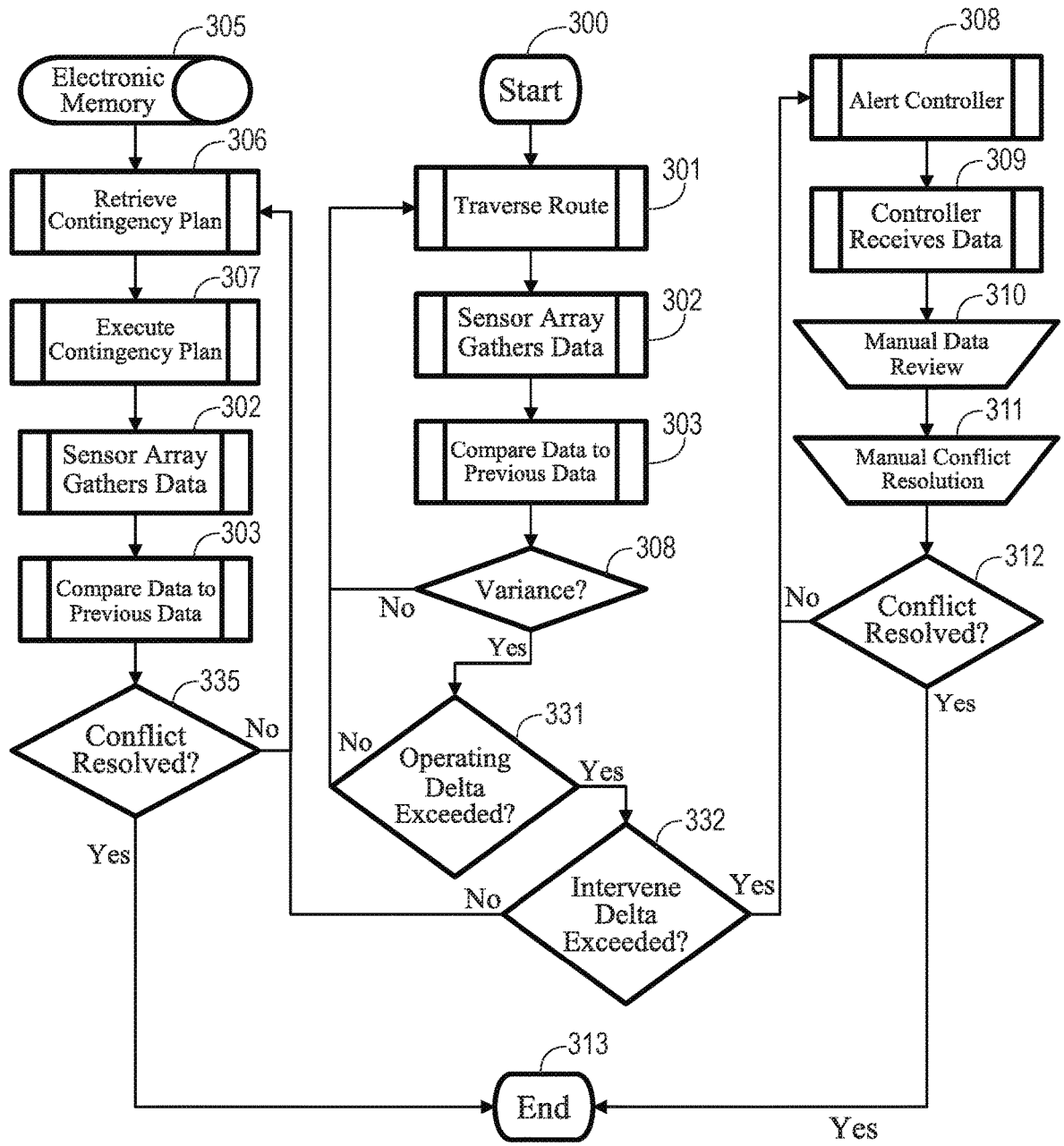
FIG. 11 is a flowchart showing the steps in a method for conflict resolution via contingency plan execution or human interaction according to examples of the present disclosure.

Referring now to FIG. 11, there is shown a flowchart showing the steps in a method for conflict resolution via contingency plan execution or human interaction as according to an embodiment of the present disclosure. The method is used by an autonomous vehicle, such as an autonomous delivery vehicle or a delivery robot, when the vehicle is delivering cargo to a destination. The method starts (at 300) when the vehicle is traversing a route (at 301) which begins at an origin and terminates at a destination. The origin can be the vehicle's storage area, a distribution center, an office, a manufacturing facility, or the like. The destination is an address in an urban environment where the cargo must be delivered.

The route traversed (at 301) by the vehicle can be a route pre-programmed into the vehicle's memory. A plurality of sensors may have been previously used to map the route and generate one or more safe operating thresholds, as discussed herein with respect to the mapping phase. The safe operating thresholds represent conditions along the route in which it is safe for the vehicle to operate.

During traversal of the route (at 301), one or more sensors contained within a sensor array mounted on the vehicle gather data (at 302) from the vehicle's environment. The gathered data, the results of an algorithm using the gathered data, or the results of sensor synthesis are compared to previously gathered data (at 303). The previously gathered data can be data that was recorded by a similar sensor on a previous traversal of the route, or the safe operating thresholds as described above. The comparison between the present data and the previously recorded data is performed in order to detect a potentially unsafe operating condition in the vehicle's immediate environment.

If there is a variance detected (at 304) between the data of one or more of the vehicle's sensors when compared to the previously stored data, a check is made to see whether the variance exceeds a safe operating delta (at 331). The safe operating delta is a maximum value, the exceedance of which can indicate an unsafe operating environment. Conditions that may give rise to the operating delta being exceeded (at 331) can include, but are not limited to, a fallen tree across a sidewalk, interference by a pedestrian or animal, a road closure, flooding, snow, police action, or an attempted theft. If the operating delta is exceeded (at 331), a contingency plan is retrieved (at 306) from an electronic memory 305. The electronic memory 305 can be located in the vehicle, or can be at a remote site accessible by wireless communications. In the case of the former, the electronic memory 305 can be a computer memory component such as a RAM module containing the contingency plan. In the case of the latter, the electronic memory 305 can be a server that is accessed by cellular communications. In some embodiments of the present disclosure, the vehicle possesses a cellular transceiver.

After the contingency plan is retrieved, it is executed (at 307) to overcome or mitigate the conditions that gave rise to the exceedance of the operating delta (at 331). In some embodiments of the present disclosure, the contingency plan is executed (at 307) until the operating delta is no longer exceeded (at 331). That is, while executing the contingency plan (at 307), data is being gathered by the vehicle's sensors (at 302) and is compared to previously gathered data (at 303). The actions executed as part of the contingency plan include, but are not limited to, any combination of actions set forth in FIG. 12.

When any variance between the gathered data and the stored data no longer exceeds the operating delta, the conflict is considered resolved (at 335) and the method ends (at 313). The vehicle can continue to traverse its route (at 301).

If the comparison of the current data to the previous data (at 303) indicates that the conflict is not resolved (at 335) the operating delta is still exceeded (at 331) and the method continues. In some embodiments of the present disclosure, the same contingency plan may be executed (at 307) until the conflict is resolved and the method ends (at 313). In other embodiments of the present disclosure, additional contingency plans may be retrieved (at 306) and executed (at 307), depending on the exact circumstances. In embodiments that retrieve and execute more than one contingency plan (at 306 and 307), this may be due to additional operating deltas being exceeded (at 332) for different sensors during execution of the initial contingency plan (at 307).

The steps set forth above correspond to when an operating delta is exceeded (at 331), but an intervention delta is not exceeded (332). An intervention delta is a threshold, the exceedance of which requires the intervention of a human operator to resolve the conflict. In some embodiments of the present disclosure, the intervention deltas are higher values for the same sensor data, or are unique data types that have no corresponding operating deltas. In the latter case, an intervention delta may be a voice recognition algorithm that operates on data received from a microphone. The intervention delta is immediately considered exceeded if the algorithm detects the phrase "help me."

If the intervention delta is exceeded (at 332) a controller is alerted (at 308). The controller is a human that is at a remote location. The remote location can be the origin from which the vehicle began traversing its route (at 301), or another location such as a control center. Data relating to the condition that caused the intervention delta to be exceeded (at 332) is transferred to the controller (at 309) so that he or she can review the situation (at 310). The transferred data can include the data from the sensor that exceeded its intervention threshold (at 332) as well as data from any or all of the other sensors in the sensor array.

After reviewing the data (at 310) the controller takes manual control of the vehicle and performs an action to resolve the conflict (at 311). The types of actions that a controller may take include, but are not limited to, any combination of actions set forth in FIG. 14. The controller can continue to receive data (at 309) from the vehicle and control the vehicle until the conflict is resolved (at 312). One indicator that the conflict is resolved is when the controller no longer observes conditions giving rise to the intervention delta being exceeded (at 332), or when received data no longer exceeds the intervention threshold. That is, a controller monitoring a live video feed from the vehicle may consider the conflict to be resolved (at 312) after they have manually driven (at 311) the vehicle around a tree in the road or when a laser rangefinder indicates they are a safe distance away from a double-parked vehicle. When the controller has resolved the conflict (at 312), the method ends (at 313).

It should be noted that the method illustrated in FIG. 11 can continue for so long as the vehicle is traversing its route (at 301).

Figure 12:
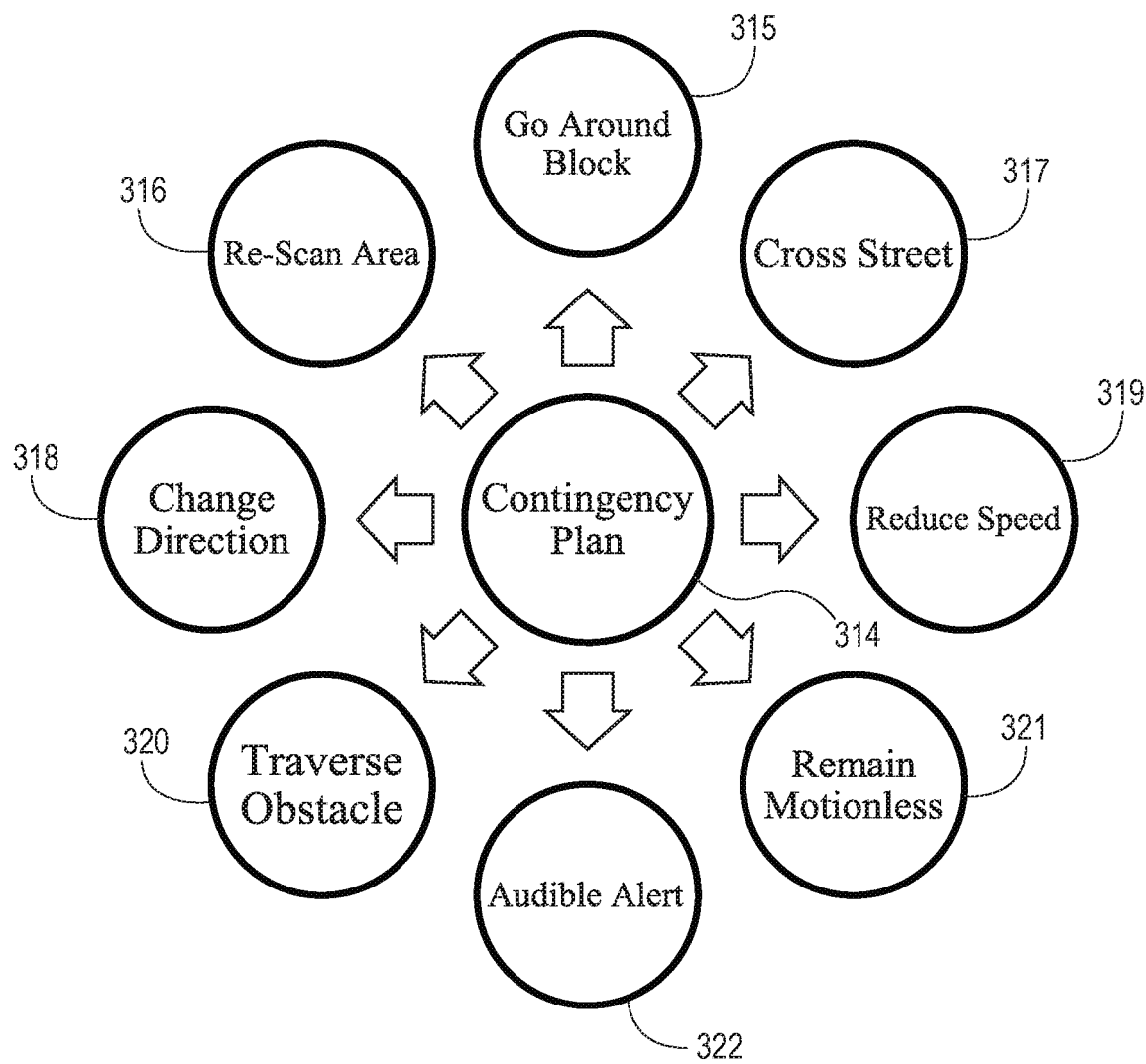
FIG. 12 is a radial diagram showing possible actions in a contingency plan as according to examples of the present disclosure.

Referring now to FIG. 12, there is shown a radial diagram with the possible actions that can be taken as part of a contingency plan 314 as according to an embodiment of the present disclosure. The contingency plan 314 is a set of pre-determined instructions that an autonomous vehicle retrieves and executes when an operating delta is exceeded. The contingency plan can include, but is not limited to: going around the block (at 315), re-scanning the area (at 316), crossing a street (at 317), changing direction in order to avoid an obstacle (at 318), reducing speed (at 319), traversing over an obstacle (at 320), remaining motionless (at 321), or sounding an audible alert (at 322). It is also possible for the vehicle to execute a combination of the aforementioned depending on the nature of the problem faced by the vehicle.

In some embodiments of the present disclosure the contingency plan 314 is generated manually or by users with the aid of algorithms prior to the vehicle beginning to traverse a route. Different contingency plans 314 can be created for different routes to be traversed by the vehicle.

Figure 13:
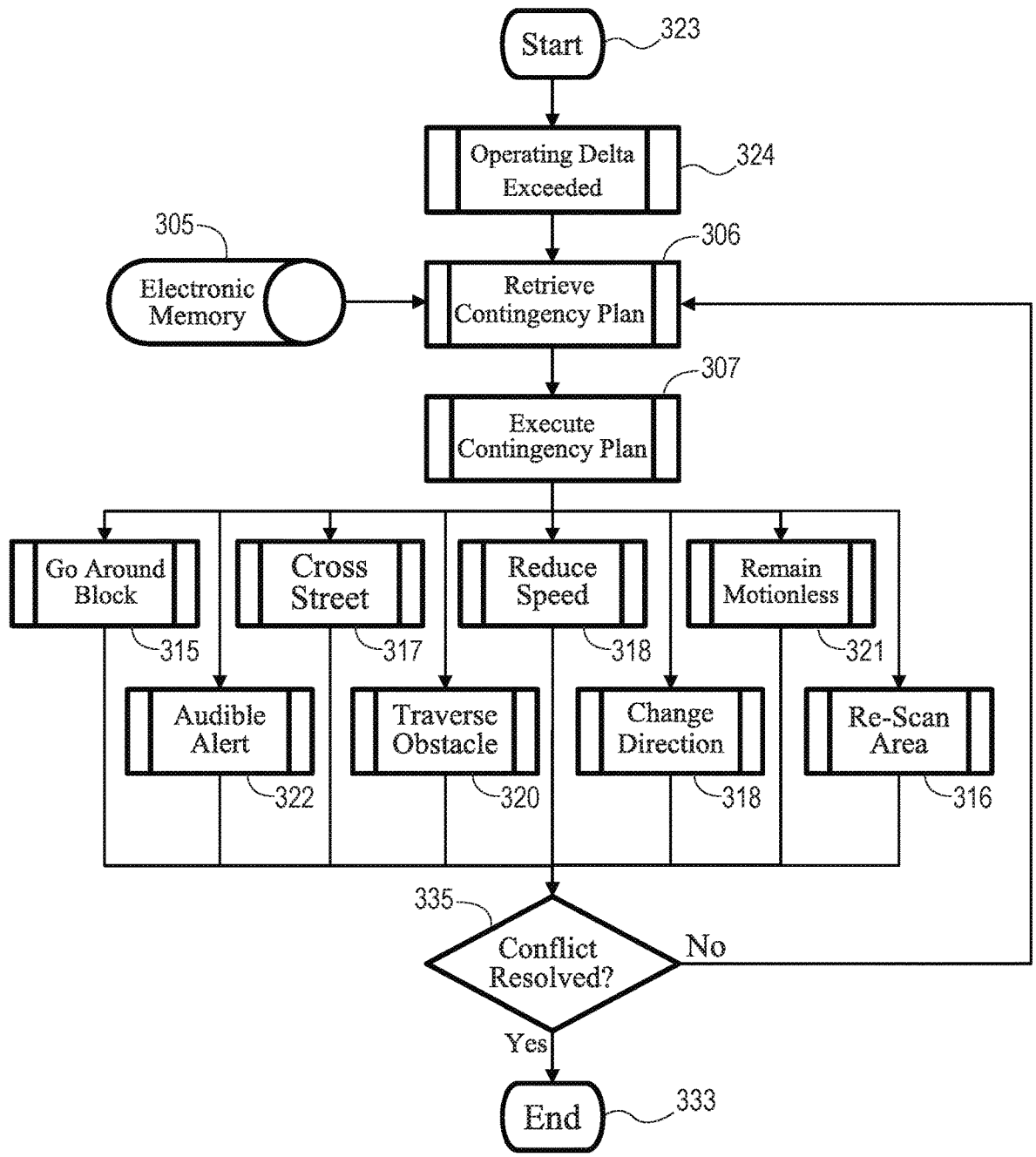
FIG. 13 is a flowchart showing the steps in a method when a contingency plan is executed according to examples of the present disclosure.

Referring now to FIG. 13, there is shown a flowchart setting forth the steps taken in a method when a contingency plan is executed as according to an embodiment of the present disclosure. The present disclosure can be used when an autonomous vehicle, such as an autonomous delivery vehicle, autonomously resolves a conflict between safe operating thresholds and conditions encountered when traversing a route. The vehicle may be in the process of travelling from an origin to a destination in order to deliver cargo to the destination.

Along the way, one or more of a plurality of sensors may detect anomalous conditions in the vehicle's immediate environment that exceed stored operating tolerances. The stored operating tolerances were previously generated and stored in an electronic memory 305, such as a database hosted on an electronic computing device, and are compared against data recorded from the vehicle's sensors. It is important to note that the stored operating tolerances can be compared against an algorithm or sensor synthesis that models data retrieved from the sensors. Such modelling is necessary when a sensor is unable to distinguish the exact nature of received data. In such cases a processing unit executes operations using the data to refine, filter, or analyze the received data.

The method illustrated in FIG. 13 starts (at 323) when an operating delta is exceeded (at 324). An operating delta is exceeded (at 324) when data from a sensor, an algorithm, or sensor synthesis exceeds a safe operating threshold. The safe operating threshold is also considered to be the stored operating tolerance, as described above. The sensor's data, an algorithm operating on the data, or synthesis of the sensor data is compared to previously stored data which can be the safe operating threshold. If the comparison results in the exceedance of the operating delta (at 324), there may be an unsafe operating condition in the vehicle's environment that requires a different set of actions to occur.

When the operating delta is exceeded (at 324), a contingency plan is retrieved (at 306). The contingency plan is a series of one or more actions to be performed by the vehicle in response to the exceedance of the operating delta (at 324). The contingency plan can be executed (at 307) until the operating delta is no longer exceeded. That is, the contingency plan remains in effect until conditions fall back within normal operating thresholds.

When the contingency plan is executed (at 307), one or more of the following actions can be taken by the delivery vehicle: going around the block (at 315) to avoid a problem or obstacle (at 315), crossing the street (at 317), reducing its speed (at 319), remaining motionless until normal operating conditions resume (at 321), sounding an audible alert to scare off animals or warn people (at 322), traversing an obstacle such as a small stick or gravel in the path of the vehicle (at 320), changing direction to avoid an obstacle (at 318), or re-scanning the area with the same or different sensors to confirm the existence of anomalous conditions (at 316).

If the conflict is resolved, the method ends (at 333). If the conflict is not resolved (at 335), an operating delta is still exceeded (at 324), the same or another contingency plan may be retrieved (at 306) from the electronic memory (at 305). Although not pictured, in an embodiment of the present disclosure the same contingency plan is repeated until the conflict is resolved (at 335). In this embodiment, the method does not return to step (at 306).

Figure 14:
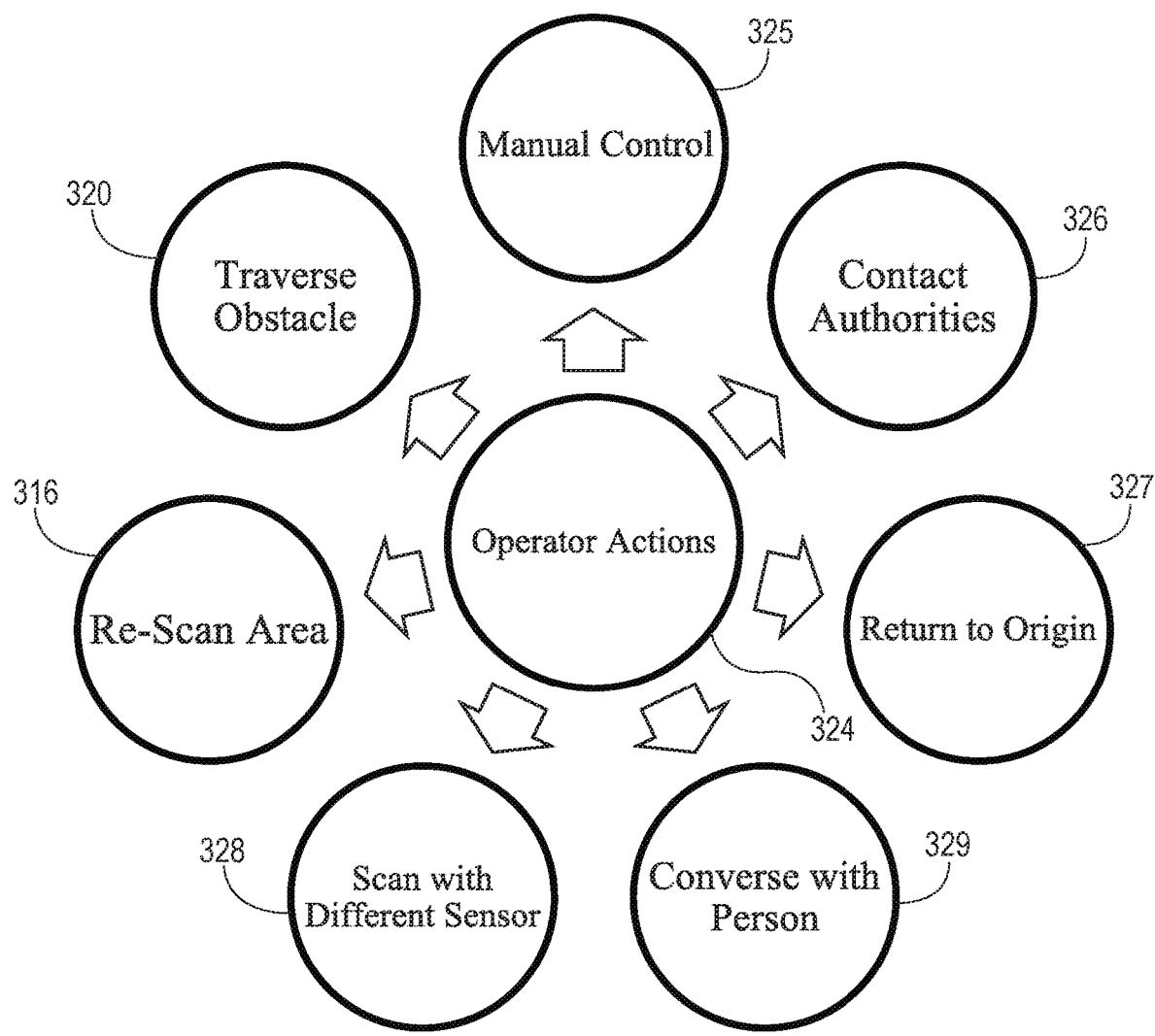
FIG. 14 is a radial diagram showing possible actions when a human operator intervenes according to examples of the present disclosure.

Referring now to FIG. 14, there is shown a radial diagram setting forth the possible actions that can be taken when a human operator intervenes as according to an embodiment of the present disclosure. The human operator is a controller that asserts manual control over an autonomous vehicle when an intervention delta is exceeded. The operator's actions 324 are a set of actions that the operator performs when the operating delta is exceeded. The operator's actions 324 can include, but are not limited to: taking manual control of the vehicle (at 325), manual control (at 325) allowing the operator to do such things as drive the vehicle, stop the vehicle, or open or close vehicle compartments; traversing obstacles (at 320) by driving the vehicle over or through the obstacle; contacting authorities (at 326), such as when an attempted theft is made or an emergent condition arises; re-scanning an area of interest using the same (at 316) or different sensors (at 328) located on the vehicle; instructing the vehicle to return to its origin (at 327); or accessing an on-board microphone and speaker to converse with a person (at 329) in the vehicle's immediate environment. It is also possible for the operator to execute a combination of the aforementioned, depending on the nature of the problem faced by the vehicle.

In some embodiments of the present disclosure the operator's actions 324 can be predetermined and executed manually in response to a condition, or may be spontaneously decided upon by the operator after reviewing vehicle data.

Figure 15:
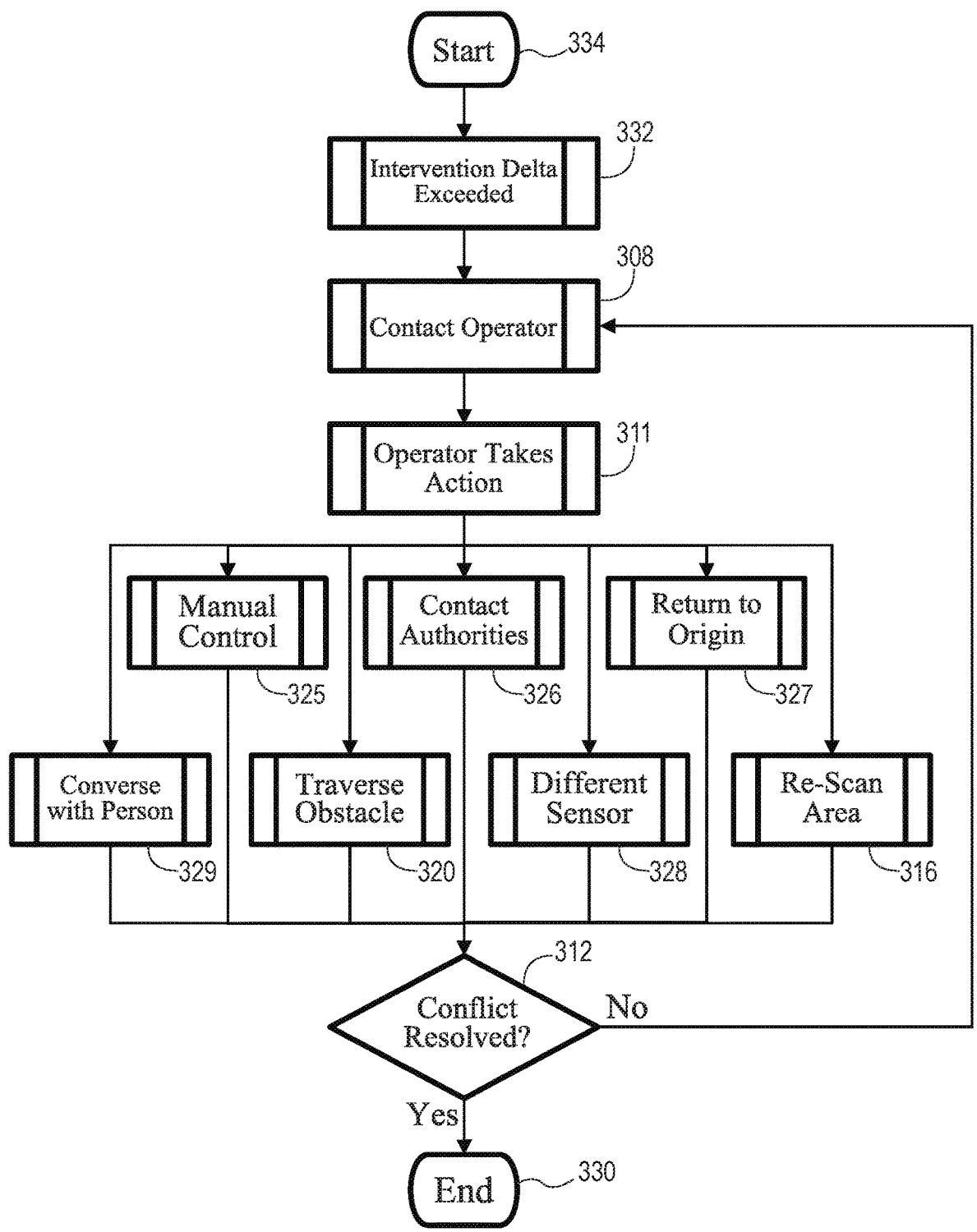
FIG. 15 is a flowchart showing the steps in a method when a human operator intervenes according to examples of the present disclosure.

Referring now to FIG. 15, there is shown a flowchart setting forth the steps taken by an operator when an intervention delta is exceeded as according to an embodiment of the present disclosure. The present disclosure can be used when an autonomous vehicle, such as an autonomous delivery vehicle, cannot or should not autonomously resolve a conflict arising between safe operating thresholds and conditions encountered when traversing a route. The conflict can arise because of previously unencountered obstacles or dangerous conditions along the route the vehicle is traversing.

Along the way, one or more of a plurality of sensors may detect anomalous conditions in the vehicle's immediate environment that exceed one or more stored intervention tolerances. The stored intervention tolerances were previously generated and stored in an electronic memory 305, such as a database hosted on an electronic computing device. The intervention tolerances are values that, when exceeded, indicate human interaction is necessary to resolve a problem or obstacle faced by an autonomous vehicle. The intervention tolerances are compared against data recorded from the vehicle's sensors. It is important to note that the stored intervention tolerances can be compared against an algorithm or sensor synthesis that models data retrieved from the sensors. Such modelling is necessary when a sensor is unable to distinguish the exact nature of received data. In such cases, a processing unit executes operations using the data to refine, filter, or analyze the received data.

The method illustrated in FIG. 15 starts (at 334) when an intervention delta is exceeded (at 332). An intervention delta is exceeded (at 332) when data from a sensor, an algorithm, or sensor synthesis exceeds a stored intervention tolerance and requires human attention. The sensor's data, an algorithm operating on the data, or synthesis of the sensor data is compared to previously stored data which can be the stored intervention tolerance. If the comparison results in the exceedance of the intervention delta (at 332), there may be an unsafe operating condition in the vehicle's environment that requires a different set of actions to occur.

When the intervention delta is exceeded (at 332) the operator is contacted (at 308) and data from the vehicle is sent to the operator. The operator takes action (at 311) in an effort to resolve the conflict by overcoming the obstacle or problem that caused the intervention delta to be exceeded (at 332). The operator can perform one or more actions (at 311) in response to the exceedance of the intervention delta (at 332). The operator can continue to take action (at 311) until the operating delta is no longer exceeded. That is, the operator takes actions (at 311) until conditions fall back within normal operating thresholds.

When the operator takes action (at 311) one or more of the following can be performed: asserting manual control over the vehicle (at 325), contacting authorities (at 326), causing the vehicle to autonomously or manually return to its origin (at 327), remotely conversing with a person through on-board hardware (at 329), driving the vehicle over or through minor obstacles (at 320), or re-scanning the area with the same (at 316) or different sensors (at 328) to confirm the existence of anomalous conditions.

If the conflict is resolved (at 312), the method ends (at 330). If the conflict is not resolved (at 312), an intervention delta is still exceeded (at 332), and the same or another action or combination of actions may be performed by the operator (at 311).

Referring now to a fourth aspect of the present disclosure, there is introduced a method and system for component-based decision-making with centralized officiating and optionally the modification of those decisions through success measurements. For the purpose of clarity, all like elements mentioned in this description will have the same designations. The terms "method for component-based decision-making with centralized officiating and the modification of those decisions through success measurements," and "method decision-making," and "voting method" may be used interchangeably.

The system disclosed herein with respect to the fourth aspect may be included in the autonomous delivery vehicles disclosed herein with reference to the first, the second, and/or the third aspects of the present disclosure. Additionally or alternatively, the method and/or electronic system disclosed herein with reference to the fourth aspect of the present disclosure may be utilized to perform one or more portions of the methods discussed herein with reference to FIGS. 10-15 of the present disclosure. That said, the methods and systems disclosed herein with reference to the fourth aspect of the present disclosure are not limited to autonomous delivery vehicles, or the methods set forth herein with reference to the first, the second, and the third aspects of the present disclosure and may be utilized for decision-making in any computer, or computer-implemented system.

The present disclosure provides a method for decision-making by an electronic system comprising a plurality of components. The components of the electronic system, herein referred to as "chips" are given tunable voting authority v=[Vmin . . . Vmax], typically [−1 . . . 1]. The overall system may be compared to a public body such as a governmental House. Many different members may propose conflicting or concurrent resolutions (proposals), each proposal comprising a set of instructions (Action). They vote on each resolution and the winning resolutions are acted upon.

A singleton officiating member, herein referred to as the "cortex", manages the notification and voting process. When the cortex loads, it inventories the chips and spawns new threads as necessary. Each chip functions as an independent intelligence. A current representation of the entire system is stored in a model. The model is a state storage system that tracks the existence and condition of a group of tracked data items, called Entities. The model is managed by the cortex but may be queried by any chip.

Chips may also include optional important constructs, for example: action drivers. Action drivers are programmed to enable certain functions or drive specific hardware, thereby allowing a chip to not only suggest a particular proposal but also provide for executing relevant actions if the proposal passes vote. Action vocabulary is a set of unique actions "A" generated from all action drivers. As another example, chips may include success centers that measure the success or positiveness of a particular situation and/or cognitive drivers that are configured to augment Entity data.

Memory functions within the cortex or a given chip can combine with the Success center to measure the relative success of any given proposal. These memories may be used to modify that chip's vote in the future.

Figure 16:
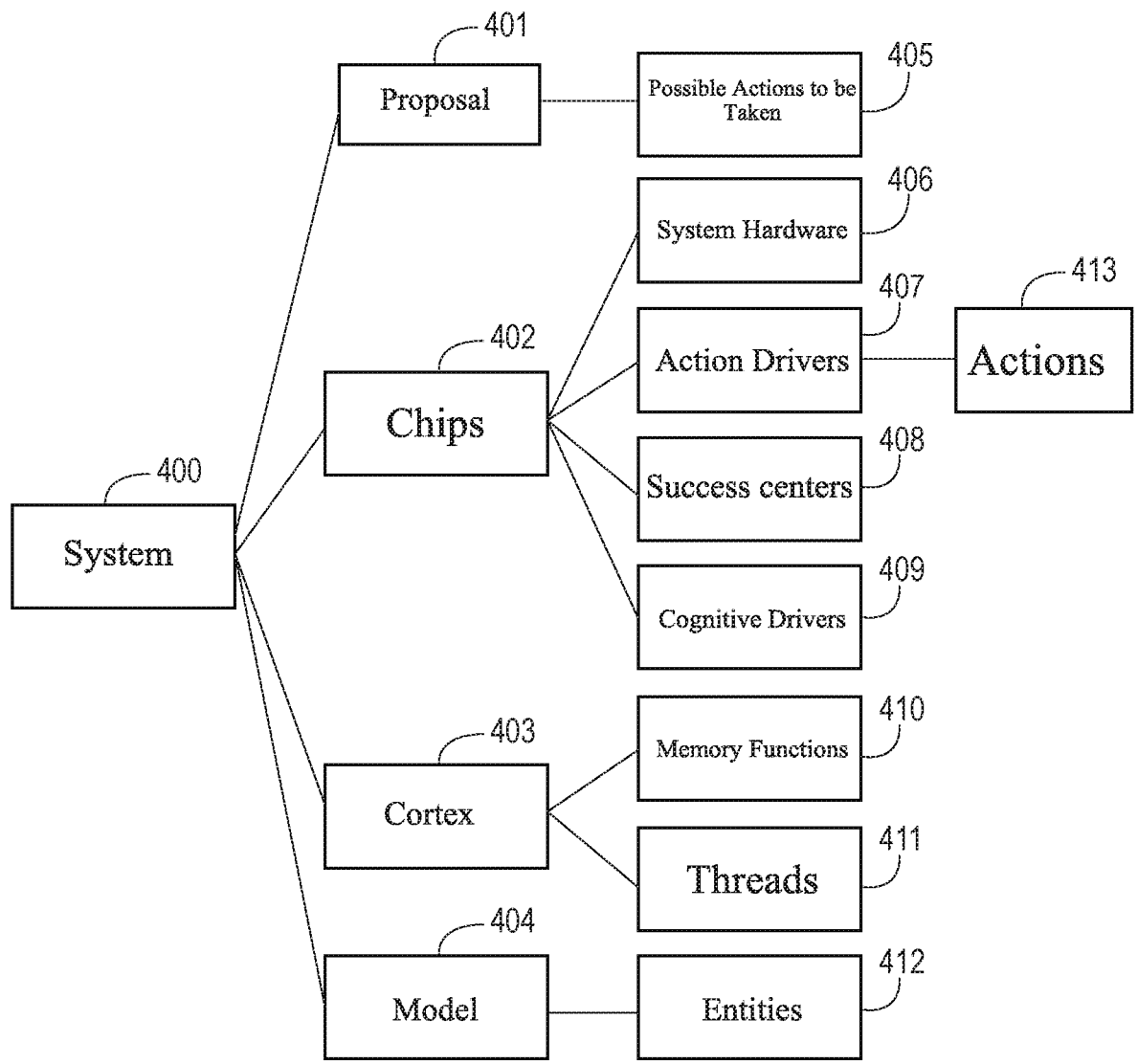
FIG. 16 is a diagram illustrating an apparatus for component based decision-making with centralized officiating.

Referring now to FIG. 16, there is shown a diagram illustrating the components in a system (400) for decision-making with centralized officiating and optionally modification of decisions through success measurements as according to an embodiment of the present disclosure. The system (400) is a computer-based system comprising at least one processing unit capable of executing machine-language instructions. The system (400) further comprises at least one memory module that can be physically configured to enter a "read" mode wherein data is read from the memory. The memory module can also be physically configured to enter a "write" mode wherein data is written to the memory.

Within the system (400) a plurality of system (400) components may Propose (401) conflicting or concurrent resolutions. Each proposal (401) comprises one or more possible instructions (405) that may be taken. These instructions are called Actions (413) in reference to the present disclosure. The components of the system vote on each resolution and the winning resolutions are acted upon.

Each voting member of the system (400) is referred to herein as a chip (402). In an embodiment of the present disclosure, a chip (402) may be, or include, a hardware component (406) of an autonomous delivery vehicle. Additionally or alternatively, one or more chips (402) within the system (400) simply may operate as voting members, for example, embodied in software in communication with hardware components. Chips (402) can include or be in communication with such hardware as a sensor array, a laser device, a radar device, a GPS receiver, an odometer, an energy monitor, a wireless communication device, a sonar device, a video recording device, a rangefinder, a microphone, or the like.

Each chip (402) has an adjustable or tunable voting authority where vote=v [Vmin . . . Vmax] with Vmin, Vmax typically=[−1 . . . 1]. The adjustability of each chip (402) provides system designers with the ability to modify the importance of each chip (402).

In some embodiments, system (400) is installed in an autonomous delivery vehicle, such as the autonomous delivery vehicles disclosed herein with reference to the first, the second, and/or the third aspects of the present disclosure. When making a decision, a battery monitor that monitors the battery charge level of the autonomous delivery vehicle may be given a higher voting authority than an audio receptor. If the autonomous delivery vehicle's battery is at low or critical levels, the battery monitor may outvote the audio receptor and cause the system to proceed regardless of hearing a dog bark. That is, the battery monitor's vote would have a higher authority and control the system's (400) decision instead of the audio receptor.

A singleton officiating member, called the cortex (403), manages the notification and voting process. When the cortex (403) loads, it inventories the chips (402) and spawns new threads (411) as necessary. Each chip (402) functions as an independent intelligence during voting.

A current representation of the entire system is stored in the model (404). The model (404) is a state storage system that tracks the existence and condition of a group of tracked data items called Entities (412). In an embodiment of the present disclosure, the Entities (412) are objects located within the environment of the autonomous delivery vehicle. An Entity (412) can be a dog, a tree, a pedestrian, a vehicle, or the like.

The model (404) is managed by the cortex (403) but may be queried by any chip (402). Chips (402) may also include constructs such as action drivers (407). Action drivers (407) are sets of machine instructions that are executed by an electronic processing unit that cause system hardware (406) to perform certain functions. Action drivers (407) also can be used to drive the hardware (406). The action drivers (407) allow chips (402) to not only suggest a proposal (401), but allow the chips (402) to perform Actions (413) if the proposal (401) passes the vote. The complete list of Actions (413) available to the system (400) is referred to, in some embodiments, as an Action vocabulary. The Action vocabulary is generated from all action drivers (407).

In some embodiments, system 200 comprises success Centers (408) that measure the success or positiveness of a particular situation. When included, success Centers (408) are used in the system (400) to determine whether the outcome of a proposal (401) was successful or not. If the proposal (401) was successful or failed, the success or failure of that proposal (401) is stored in the memory (410) of the cortex (403). The cortex (403) may, but is not required to, override the vote of chips (402) in another proposal (401) vote if the present situation or proposal (401) is similar to the proposal (401) stored in its memory (410).

Cognitive drivers (409) are sets of machine instructions that, when executed by an electronic processing unit, augment Entity (412) data. The Cognitive drivers (409) can be algorithms that analyze data gathered from a chip (402) and identify the Entity (412) that the system (400) has encountered.

Memory Functions (410) within the cortex (403) or a given chip (402) can combine with the Success Centers (408) to measure the relative success of any given proposal (401). These Memory Functions (410) may be used to modify that chip's (402) vote in the future.

Figure 17:
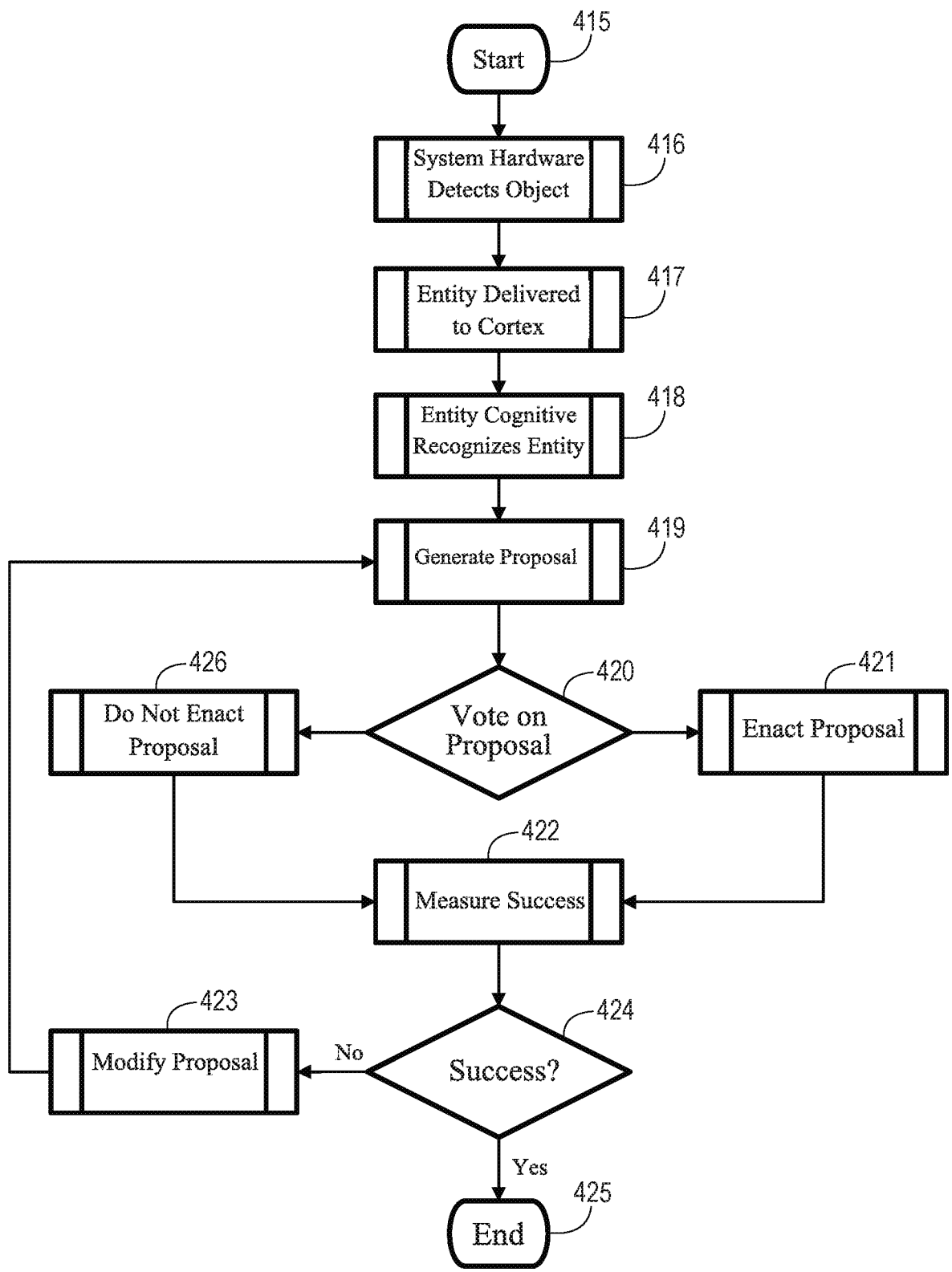
FIG. 17 is a flow chart that schematically illustrates examples of a method for component based decision-making with centralized officiating.

Referring now to FIG. 17, there is shown a flowchart with the steps in a method for decision-making with centralized officiating and optionally modification of decisions through success measurements as according to an embodiment of the present disclosure. The method is executed on an electronic device that physically configures hardware components, such as electronic memory modules or system motors, into different operating modes in response to method steps. In an embodiment of the present disclosure, the execution of the method by the electronic device causes an electronic motor on an autonomous vehicle to cause the vehicle to move forward. In another embodiment of the present disclosure, the method causes a wireless communications device on an autonomous delivery vehicle to contact a human operator for further instructions.

The method starts (at 415) when system hardware detects an object (at 416) such as an entity described above in the discussion of FIG. 16. The entity is delivered to the cortex (at 417) and the cortex creates an event that the hardware has detected the entity. Additionally or alternatively, the object detected at 416 is stored in the Model, which may be queried by any chip. An entity cognitive within the system recognizes the entity that was detected (at 418). A chip within the system decides on an action to take, and generates a proposal (at 419) comprising the action. The chips within the system vote on the proposal (at 420).

If the proposal is voted in, it is acted upon (at 421). If the proposal is not voted in, it is not acted upon (at 426). In some embodiments, the success of enacting or not enacting the proposal is measured (at 422) and the measurement is stored within the system. In such embodiments, if the decision whether to enact or not enact the proposal was successful (at 424), then the method ends (at 425). Additionally or alternatively, in some such embodiments, if the decision was not successful, another proposal can be generated but modified (at 423) using the success measurement from step 422. That is, the chip that generated the previous proposal can remember that the proposal was unsuccessful and generate an alternate proposal.

As a specific example of the present disclosure, a system comprises only two chips: Delivery and Dog. Delivery's purpose is to deliver something. Dog's purpose is to avoid getting bitten. The following set of circumstances may ensue. Delivery proposes P containing actions $\alpha=[a0, a1, \ldots an]$ $(an \in A)$ movement in the direction of some destination. Vote: Delivery votes 0.5, Dog votes 0 (neutral). Delivery proposal commences executing actions.

After some time, visual hardware detects an object. It delivers an Entity to the cortex, which bubbles an event that Dog has registered to receive: entity.add. The Dog Cognitive recognizes that it is seeing a dog and updates the Entity metadata. It decides that the solution is to run and proposes $P \neq '$ with $\alpha \neq '=[a \neq '0, a \neq '1, \ldots a \neq 'n]$ "run away". Vote: Delivery votes −0.5, Dog votes 1. proposal "Run away" begins.

Once the dog threat no longer exists, $P \neq '$ is complete and Delivery again proposes something like P. It is voted in again. The dog is encountered again, and again it is evaded.

Delivery remembers that it has tried P twice with no success, both times being aborted by $P \neq '$. It proposes $P = "$ which uses a different route. This time, no dog is encountered and the delivery is successful.

Those skilled in the art will appreciate that the conception, upon which this disclosure is based, may readily be utilized as a basis for designing other structures, methods, and systems for carrying out the several purposes of the present disclosure. It is important, therefore, that this description be regarded as including such equivalent constructions insofar as they do not depart from the spirit and scope of the present disclosure.

Although certain example methods, apparatus, and articles of manufacture have been described herein, the scope of coverage of this application is not limited thereto.

On the contrary, this application covers all methods, apparatus and articles of manufacture fairly falling within the scope of the disclosure, either literally or under the doctrine of equivalents.

Therefore, the foregoing is considered as illustrative only of the principles of autonomous vehicles, methods for determining safe and traversable routes, methods for re-mapping a safe and traversable route during delivery operations, methods for conflict resolution via contingency plan execution or human interaction, and methods for component-based decision-making with centralized officiating. Further, since numerous modifications and changes will readily occur to those skilled in the art, it is not desired to limit the method for re-mapping a safe and traversable route during delivery operations to the exact construction and operation described, and accordingly, all suitable modifications and equivalents may be resorted to, falling within the scope of the present disclosure. While the above description describes various embodiments of the present disclosure, it will be clear that the present disclosure may be otherwise easily adapted to fit other configurations.

As various changes could be made in the above constructions without departing from the scope of the disclosure, it is intended that all matter contained in the above description shall be interpreted as illustrative and not in a limiting sense.

The invention claimed is:

1. A method for responding to unsafe conditions detected by a robot vehicle during operations, the method comprising:
    following a route profile by the robot vehicle to traverse a route, wherein the route profile comprises information respective to a stored set of one or more objects contained within the route, wherein a preset operating delta and a preset intervention delta are associated with the route profile;
    traversing the route by the robot vehicle while gathering one or more sensor data sets, wherein each sensor data set comprises information respective to a detected set of one or more objects contained in the route, wherein the detected set of one or more objects comprises a new route profile;
    comparing the route profile and the new route profile to determine a variance between the stored set of one or more objects and the detected set of one or more objects;
    calculating whether the variance exceeds the preset operating delta;
    calculating whether the variance exceeds the preset intervention delta responsive to calculating that the preset operating delta is exceeded;
    executing by the robot vehicle a contingency plan responsive to calculating that the variance exceeds the preset operating delta and does not exceed the preset intervention delta, wherein the contingency plan includes one or more instructions for the robot vehicle to execute;
    alerting a remote operator at a remote location from the robot vehicle responsive to calculating that the variance exceeds the preset intervention delta and the preset operating delta; and
    continuing to traverse the route by the robot vehicle responsive to calculating that the variance does not exceed the preset operating delta.

2. The method of claim 1, wherein the one or more instructions include one or more of reducing speed, taking an alternate route, and remaining motionless.

3. The method of claim 1, wherein the variance is determined to exceed one or more of the preset operating delta and the preset intervention delta when an object that is included in the new route profile is not included in the route profile.

4. The method of claim 3, wherein the object includes one or more of a fallen tree, a pedestrian, a pothole, an aggressive animal, a street closure, a trash can, a recycling can, snow, and ice.

5. The method of claim 1, further comprising: reviewing by the remote operator the one or more sensor data sets that were gathered before, during, and after the preset intervention delta is exceeded; and determining by the remote operator an occurrence that caused the preset intervention delta to be exceeded, wherein the occurrence is one of a non-traversable condition that is not represented in the route profile and a false alarm.

6. The method of claim 5, further comprising: updating the route profile manually by the remote operator to include the non-traversable condition represented in the new route profile, and updating the route profile manually by the remote operator to avoid the non-traversable condition when the remote operator determines that the occurrence is caused by the non-traversable condition.

7. The method of claim 5, further comprising: adjusting one or more of the preset operating delta and the preset intervention delta when the remote operator determines that the occurrence is caused by the false alarm.

8. The method of claim 1, wherein the route profile further includes additional navigation information, and wherein the additional navigation information includes one or more of cardinal directions, turn directions, landmarks, terrain information, environmental information, and chronological information.

9. A method for responding to an anomalous condition encountered by a robot vehicle, the method comprising:
    causing the robot vehicle to traverse a route by following a pre-programmed route that is stored on a memory included in the robot vehicle, wherein the pre-programmed route includes a set of expected conditions that are contained within the route, wherein an operating delta and an intervention delta are associated with the set of expected conditions, wherein the operating delta and the intervention delta each have a magnitude, and wherein the magnitude of the intervention delta is greater than the magnitude of the operating delta;
    collecting by the robot vehicle one or more sensor data sets on a detected set of one or more conditions contained within the route;
    encountering an anomalous condition by the robot vehicle while the robot vehicle traverses the route;
    gathering sensor information on the anomalous condition by the robot vehicle; and
    including the sensor information on the anomalous condition in the detected set of one or more conditions;
    comparing the detected set of one or more conditions and the set of expected conditions, and determining a variance between the detected set of one or more conditions and the set of expected conditions, wherein the variance is caused by the anomalous condition;
    calculating whether the variance exceeds the operating delta; and
    calculating whether the variance exceeds the intervention delta responsive to calculating that the variance exceeds the operating delta;
    executing a contingency plan responsive to determining that the variance exceeds the operating delta and does not exceed the intervention delta, wherein the contingency plan includes one or more instructions for the robot vehicle to execute to traverse the anomalous condition; and contacting a remote operator at a remote location from the robot vehicle responsive to calculating that the variance exceeds the operating delta and the intervention delta, and sending by the robot vehicle the one or more sensor data sets that include information respective to the detected set of one or more conditions to the remote operator.

10. The method of claim 9, further comprising: reviewing by the remote operator the detected set of one or more conditions when the robot vehicle contacts the remote operator; and controlling the robot vehicle remotely by the remote operator to resolve the anomalous condition based on the detected set of one or more conditions.

11. The method of claim 9, wherein the anomalous condition includes one or more of a minor obstacle, a fallen tree, interference by a pedestrian, interference by an animal, a road closure, flooding, snow, ice, police action, and an attempted theft.

12. The method of claim 11, further comprising contacting authorities by the remote operator when the anomalous condition is an attempted theft.

\* \* \* \* \*